United States Patent
Zhu et al.

(10) Patent No.: US 11,959,535 B1
(45) Date of Patent: Apr. 16, 2024

(54) CONTINUOUSLY VARIABLE TRANSMISSION WITH BOTH EQUAL-DIFFERENCE OUTPUT AND EQUAL-RATIO OUTPUT

(71) Applicant: JIANGSU UNIVERSITY, Zhenjiang (CN)

(72) Inventors: Zhen Zhu, Zhenjiang (CN); Lingxin Zeng, Zhenjiang (CN); Yingfeng Cai, Zhenjiang (CN); Long Chen, Zhenjiang (CN); Yanpeng Yang, Zhenjiang (CN); Dongqing Wang, Zhenjiang (CN); Yulin Deng, Zhenjiang (CN); Xiaodong Sun, Zhenjiang (CN); Xiang Tian, Zhenjiang (CN); Yong Wang, Zhenjiang (CN); Falin Zeng, Zhenjiang (CN); Chaofeng Pan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/013,264

(22) PCT Filed: Jan. 10, 2022

(86) PCT No.: PCT/CN2022/070913
§ 371 (c)(1),
(2) Date: Dec. 28, 2022

(87) PCT Pub. No.: WO2023/130420
PCT Pub. Date: Jul. 13, 2023

(30) Foreign Application Priority Data

Jan. 5, 2022 (CN) .......................... 202210008283.9

(51) Int. Cl.
*F16H 1/28* (2006.01)
*F16H 47/04* (2006.01)
(Continued)

(52) U.S. Cl.
CPC ..... *F16H 47/04* (2013.01); *F16H 2001/2881* (2013.01); *F16H 2003/123* (2013.01); *F16H 2037/028* (2013.01); *F16H 2300/02* (2013.01)

(58) Field of Classification Search
CPC ............ F16H 47/04; F16H 2001/2881; F16H 2003/123; F16H 2037/028; F16H 2300/02
See application file for complete search history.

(56) References Cited

U.S. PATENT DOCUMENTS 9,394,983 B2 * 7/2016 Shiozaki ................. F16H 47/02
2007/0004547 A1 1/2007 Ripamonti et al.

FOREIGN PATENT DOCUMENTS

CN 103453104 A 12/2013
CN 103591247 A 2/2014
(Continued)

*Primary Examiner* — Justin Holmes
(74) *Attorney, Agent, or Firm* — Bayramoglu Law Offices LLC

(57) ABSTRACT

A continuously variable transmission with both equal-difference output and equal-ratio output includes an input mechanism, a hydraulic transmission mechanism, a planetary-gear-set convergence mechanism, an equal-difference output mechanism, an equal-ratio output mechanism, a clutch assembly, and a brake. The clutch assembly connects an output end of the input mechanism to an input end of the hydraulic transmission mechanism and the planetary-gear-set convergence mechanism and connects an output end of the hydraulic transmission mechanism to the planetary-gear-set convergence mechanism. The clutch assembly connects the planetary-gear-set convergence mechanism to the equal-difference output mechanism and the equal-ratio output mechanism. The clutch assembly connects the equal-ratio output mechanism to the equal-difference output mechanism. A continuously changing transmission ratio between the input mechanism and the equal-difference output mechanism/the equal-ratio output mechanism is provided by (Continued)

adjusting a displacement ratio of the hydraulic transmission mechanism and selectively controlling engagement of the clutch assembly and the brake.

7 Claims, 16 Drawing Sheets

(51) Int. Cl.
*F16H 3/12* (2006.01)
*F16H 37/02* (2006.01)

(56) References Cited

FOREIGN PATENT DOCUMENTS

| | | | | | |
|---|---|---|---|---|---|
| CN | 104179925 | A | | 12/2014 | |
| CN | 104819263 | A | | 8/2015 | |
| CN | 207333618 | U | | 5/2018 | |
| CN | 112360949 | A | | 2/2021 | |
| CN | 113137462 | A | * | 7/2021 | ............. B60K 17/02 |
| GB | 2597849 | A | * | 2/2022 | ............. F16H 33/00 |
| JP | 2012062925 | A | | 3/2012 | |

* cited by examiner

CONTINUOUSLY VARIABLE TRANSMISSION WITH BOTH EQUAL-DIFFERENCE OUTPUT AND EQUAL-RATIO OUTPUT

CROSS REFERENCE TO THE RELATED APPLICATIONS

This application is the national phase entry of International Application No. PCT/CN2022/070913, filed on Jan. 10, 2022, which is based upon and claims priority to Chinese Patent Application No. 202210008283.9, filed on Jan. 5, 2022, the entire contents of which are incorporated herein by reference.

TECHNICAL FIELD

The present disclosure relates to the technical field of vehicle transmission, and in particular, to a continuously variable transmission with both equal-difference output and equal-ratio output.

BACKGROUND

The vigorous promotion of agricultural modernization calls for further development of agricultural machinery. Agricultural power machinery represented by tractors generally needs to deal with transfer and operation conditions. Their complex working environments and variable loads raise increasingly high requirements on the integrated performance of the transmission system.

At present, the common transmission modes of tractors include hydrostatic transmission and mechanical transmission. The hydrostatic transmission is flexible and stable, but it has low efficiency and is limited by the power of hydraulic components, so it is not suitable for large tractors. Although the mechanical transmission has high efficiency, it requires more gears to adapt to different driving and working conditions, which leads to a complex structure, increased operation difficulty, and poor vehicle fuel economy. The hydro-mechanical hybrid transmission has the advantages of large power density of the hydraulic transmission and high efficiency of the mechanical transmission. It realizes the hydro-mechanical continuously variable transmission by reasonably adjusting the variation range of the displacement ratio, so that gear shift without power interruption can be carried out and a wider speed regulation range can generally be reached. Therefore, the hydro-mechanical hybrid transmission is gradually being used in agricultural machinery and military vehicles.

SUMMARY

To eliminate the defects in the prior art, the present disclosure provides a continuously variable transmission with both equal-difference output and equal-ratio output. In the device, a hydraulic stage for startup of a vehicle is added to the equal-ratio output, thereby realizing zero-speed output of stepless transmission, and a reverse gear function of the hydraulic stage is realized by adjusting forward and reverse strokes of a hydraulic motor, so that a reverse gear mechanism is not need in the transmission device.

The present disclosure achieves the above objective through the following technical solution.

A continuously variable transmission with both equal-difference output and equal-ratio output includes an input mechanism, a hydraulic transmission mechanism, a planetary-gear-set convergence mechanism, an equal-difference output mechanism, an equal-ratio output mechanism, a clutch assembly, and a brake B, wherein the clutch assembly connects an output end of the input mechanism to an input end of the hydraulic transmission mechanism and the planetary-gear-set convergence mechanism and connects an output end of the hydraulic transmission mechanism to the planetary-gear-set convergence mechanism, the clutch assembly connects the planetary-gear-set convergence mechanism to the equal-difference output mechanism and the equal-ratio output mechanism, and the clutch assembly connects the equal-ratio output mechanism to the equal-difference output mechanism;

a continuously changing transmission ratio between the input mechanism and the equal-difference output mechanism and/or between the input mechanism and the equal-ratio output mechanism is provided by adjusting a displacement ratio of the hydraulic transmission mechanism and selectively controlling engagement of the clutch assembly and the brake B.

Further, the planetary-gear-set convergence mechanism includes a front planetary gear mechanism and a rear planetary gear mechanism, wherein a ring gear of the front planetary gear mechanism is connected to a ring gear of the rear planetary gear mechanism, and the input end of the hydraulic transmission mechanism is connected to a sun gear of the front planetary gear mechanism;

the clutch assembly includes a hydraulic path input clutch $C_1$, a first variable transmission ratio output clutch $C_6$, a sixth variable transmission ratio output clutch $C_{11}$, and a coupling mechanism L, wherein the hydraulic path input clutch $C_1$ is used for selectively connecting the output end of the input mechanism to the input end of the hydraulic transmission mechanism via a hydraulic path input gear pair $i_1$; the first variable transmission ratio output clutch $C_6$ is used for selectively connecting the output end of the hydraulic transmission mechanism to the equal-difference output mechanism via a first variable transmission ratio output gear pair $i_4$; the sixth variable transmission ratio output clutch $C_{11}$ is used for selectively connecting the output end of the hydraulic transmission mechanism to the equal-ratio output mechanism via a sixth variable transmission ratio output gear pair $i_9$; the coupling mechanism L is used for selectively connecting the equal-difference output mechanism to the equal-ratio output mechanism;

the hydraulic path input clutch $C_1$ and the first variable transmission ratio output clutch $C_6$ are engaged to provide continuous hydraulic transmission $H_1$ between the input mechanism and the equal-difference output mechanism; the hydraulic path input clutch $C_1$ and the sixth variable transmission ratio output clutch $C_{11}$ are engaged to provide continuous hydraulic transmission $H_2$ between the input mechanism and the equal-ratio output mechanism; the hydraulic path input clutch $C_1$, the sixth variable transmission ratio output clutch $C_{11}$, and the coupling mechanism L are engaged to provide continuous hydraulic transmission $H_3$ between the input mechanism and the equal-difference output mechanism and between the input mechanism and the equal-ratio output mechanism.

Further, the clutch assembly further includes a first mechanical path input clutch $C_2$, a second mechanical path input clutch $C_3$, a fixed connection clutch $C_4$, a rear planetary-gear-set hydraulic power input clutch $C_5$, a second variable transmission ratio output clutch $C_7$, a third variable transmission ratio output clutch $C_8$, a fourth variable transmission ratio output clutch $C_9$, and a fifth variable transmission ratio output clutch $C_{10}$;

the first mechanical path input clutch $C_2$ is used for selectively connecting the output end of the input mechanism to a planet carrier of the front planetary gear mechanism via a first mechanical path input gear pair $i_2$; the second mechanical path input clutch $C_3$ is used for selectively connecting the output end of the input mechanism to the ring gear of the rear planetary gear mechanism via a second mechanical path input gear pair $i_3$; the fixed connection clutch $C_4$ is used for selectively connecting the ring gear of the rear planetary gear mechanism to a planet carrier of the rear planetary gear mechanism; the rear planetary-gear-set hydraulic power input clutch $C_5$ is used for selectively connecting the output end of the hydraulic transmission mechanism to a sun gear of the rear planetary gear mechanism; the second variable transmission ratio output clutch $C_7$ is used for selectively connecting the planet carrier of the front planetary gear mechanism to the equal-difference output mechanism via a second variable transmission ratio output gear pair $i_5$; the third variable transmission ratio output clutch $C_8$ is used for selectively connecting the planet carrier of the front planetary gear mechanism to the equal-difference output mechanism via a third variable transmission ratio output gear pair $i_6$; the fourth variable transmission ratio output clutch $C_9$ is used for selectively connecting the planet carrier of the rear planetary gear mechanism to the equal-ratio output mechanism via a fourth variable transmission ratio output gear pair $i_7$; the fifth variable transmission ratio output clutch $C_{10}$ is used for selectively connecting the planet carrier of the rear planetary gear mechanism to the equal-ratio output mechanism via a fifth variable transmission ratio output gear pair $i_8$;

the hydraulic path input clutch $C_1$, the second mechanical path input clutch $C_3$, and the second variable transmission ratio output clutch $C_7$ are engaged to provide continuous hydro-mechanical transmission $HM_f$ between the input mechanism and the equal-difference output mechanism;

the hydraulic path input clutch $C_1$, the second mechanical path input clutch $C_3$, and the third variable transmission ratio output clutch $C_8$ are engaged to provide continuous hydro-mechanical transmission $HM_z$ between the input mechanism and the equal-difference output mechanism;

the hydraulic path input clutch $C_1$, the second mechanical path input clutch $C_3$, the rear planetary-gear-set hydraulic power input clutch $C_5$, and the fourth variable transmission ratio output clutch $C_9$ are engaged to provide continuous hydro-mechanical transmission $HM_1$ between the input mechanism and the equal-difference output mechanism;

the hydraulic path input clutch $C_1$, the first mechanical path input clutch $C_2$, the fixed connection clutch $C_4$, and the fourth variable transmission ratio output clutch $C_9$ are engaged to provide continuous hydro-mechanical transmission $HM_2$ between the input mechanism and the equal-difference output mechanism;

the hydraulic path input clutch $C_1$, the second mechanical path input clutch $C_3$, the rear planetary-gear-set hydraulic power input clutch $C_5$, and the fifth variable transmission ratio output clutch $C_{10}$ are engaged to provide continuous hydro-mechanical transmission $HM_3$ between the input mechanism and the equal-difference output mechanism;

the hydraulic path input clutch $C_1$, the first mechanical path input clutch $C_2$, the fixed connection clutch $C_4$, and the fifth variable transmission ratio output clutch $C_{10}$ are engaged to provide continuous hydro-mechanical transmission $HM_4$ between the input mechanism and the equal-difference output mechanism;

the hydraulic path input clutch $C_1$, the first mechanical path input clutch $C_2$, the rear planetary-gear-set hydraulic power input clutch $C_5$, the fourth variable transmission ratio output clutch $C_9$, and the coupling mechanism L are engaged to provide continuous hydro-mechanical transmission $HM_5$ between the input mechanism and the equal-difference output mechanism and between the input mechanism and the equal-ratio output mechanism;

the hydraulic path input clutch $C_1$, the first mechanical path input clutch $C_2$, the rear planetary-gear-set hydraulic power input clutch $C_5$, the fifth variable transmission ratio output clutch $C_{10}$, and the coupling mechanism L are engaged to provide continuous hydro-mechanical transmission $HM_6$ between the input mechanism and the equal-difference output mechanism and between the input mechanism and the equal-ratio output mechanism.

Further, when $$\frac{i_4}{i_5} = 1 + k_1 \text{ and } \frac{i_3}{i_1} = \frac{k_1}{2},$$

equal-difference two-stage stepless shift is formed between the hydraulic transmission $H_1$ and the hydro-mechanical transmission $HM_f$ by adjusting the displacement ratio of the hydraulic transmission mechanism and selectively controlling the clutch assembly, wherein $k_1$ is a planetary gear characteristic parameter of the front planetary gear mechanism.

Further, when $$\frac{i_9}{i_6} = 1 + k_1 \text{ and } \frac{i_3}{i_1} = \frac{k_1}{2},$$

equal-difference two-stage stepless shift is formed between the hydraulic transmission $H_3$ and the hydro-mechanical transmission $HM_z$ by adjusting the displacement ratio of the hydraulic transmission mechanism and selectively controlling the clutch assembly, wherein $k_1$ is the planetary gear characteristic parameter of the front planetary gear mechanism.

Further, when $$\frac{\frac{k_2}{i_3}+\frac{1}{i_1}}{\frac{k_2}{i_3}-\frac{1}{i_1}} = \frac{\frac{1+k_1}{i_2}+\frac{1}{i_1}}{\frac{i+k_1}{i_2}-\frac{1}{i_1}}, \frac{\frac{k_2}{i_3}+\frac{1}{i_1}}{(1+k_2)} = \frac{\frac{1+k_1}{i_2}-\frac{1}{i_1}}{k_1},$$

$$\text{and } \frac{\frac{1+k_1}{i_2}+\frac{1}{i_1}}{k_1 i_7} = \frac{\frac{k_2}{i_3}-\frac{1}{i_1}}{(1+k_2)i_8},$$

equal-ratio four-stage stepless shift is formed between the hydraulic transmission $H_2$, the hydro-mechanical transmission $HM_1$, the hydro-mechanical transmission $HM_2$, the hydro-mechanical transmission $HM_3$, and the hydro-mechanical transmission $HM_4$ by adjusting the displacement ratio of the hydraulic transmission mechanism and selectively controlling the clutch assembly, wherein $k_1$ is the planetary gear characteristic parameter of the front planetary gear mechanism and $k_2$ is a planetary gear characteristic parameter of the rear planetary gear mechanism.

Further, the brake B is used for selectively connecting the sun gear of the front planetary gear mechanism to a fixed member; mechanical transmission of multiple transmission ratios is provided between the input mechanism and the equal-difference output mechanism or between the input mechanism and the equal-ratio output mechanism by selectively controlling engagement of the clutch assembly and the brake B.

The present disclosure has the following beneficial effects:

1. According to the continuously variable transmission with both equal-difference output and equal-ratio output of the present disclosure, multiple transmission modes including mechanical transmission, hydraulic transmission, and hydro-mechanical hybrid transmission can be realized by controlling engagement and disengagement of the clutch assembly and the brake, which meets the requirements of agricultural power machinery in different working conditions and features good startup, stepless speed regulation, and efficient transmission.

2. The continuously variable transmission with both equal-difference output and equal-ratio output of the present disclosure has a compact structure. The two modes of the equal-difference two-stage output and the equal-ratio four-stage output are formed by the combination of the two convergence planetary gear sets and the ordinary gear train, thereby simplifying the mechanism. According to the equal-difference continuous output and the equal-ratio continuous output, the zero-speed startup and reverse gear working conditions can be realized by the hydraulic stage. Besides, the coupling mechanism can be selectively used to realize hybrid equal-difference and equal-ratio continuous power outputs, so as to reach a wider speed regulation range.

3. According to the continuously variable transmission with both equal-difference output and equal-ratio output of the present disclosure, the hydraulic transmission mechanism is provided with the brake. In the case of oil leakage, damaged components, or other problems in the hydraulic system, the brake can be engaged to hold the hydraulic path and the entire transmission system becomes a stepped mechanical transmission with multiple gears including reverse gears.

4. According to the continuously variable transmission with both equal-difference output and equal-ratio output of the present disclosure, dual power output shafts including a front power take-off (PTO) and a rear PTO are provided. The front PTO is directly connected to the engine, and after the engine is started, the power output shaft directly outputs the engine power for the operating machinery. The rear PTO is connected to the hydraulic power output shaft, so that the flexibility of hydraulic transmission is achieved and the rotation direction can be changed by adjusting the forward and reverse strokes of the motor.

5. According to the continuously variable transmission with both equal-difference output and equal-ratio output of the present disclosure, the hydraulic stage for startup of a vehicle is added to the equal-ratio output, thereby realizing zero-speed output of stepless transmission, and the reverse gear function of the hydraulic stage is realized by adjusting the forward and reverse strokes of the hydraulic motor, so that a reverse gear mechanism is not need in the transmission device.

Figure 1:
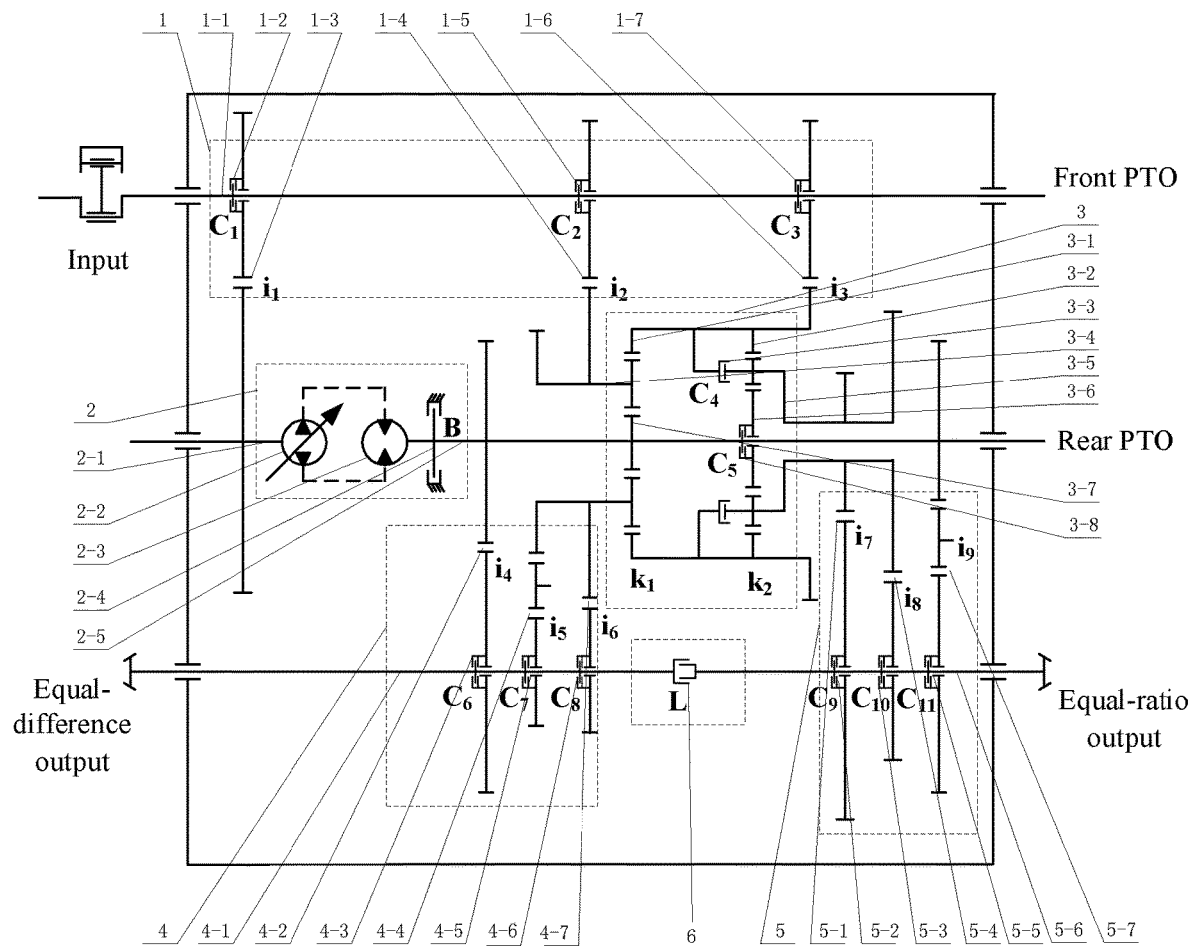
FIG. 1 is a schematic diagram of a continuously variable transmission with both equal-difference output and equal-ratio output according to the present disclosure.

1. input mechanism; 1-1. input shaft; 1-2. hydraulic path input clutch $C_1$; 1-3. hydraulic path input gear pair $i_1$; 1-4. first mechanical path input gear pair $i_2$; 1-5. first mechanical path input clutch $C_2$; 1-6. second mechanical path input gear pair $i_3$; 1-7. second mechanical path input clutch $C_3$; 2. hydraulic transmission mechanism; 2-1. hydraulic power input shaft; 2-2. variable displacement pump; 2-3. fixed displacement motor; 2-4. brake B; 2-5. hydraulic power output shaft; 3. planetary-gear-set convergence mechanism; 3-1. front planetary-gear-set ring gear; 3-2. rear planetary-gear-set ring gear; 3-3. fixed connection clutch $C_4$; 3-4. front planetary-gear-set planet carrier; 3-5. rear planetary-gear-set planet carrier; 3-6. rear planetary-gear-set sun gear; 3-7. front planetary-gear-set sun gear; 3-8. rear planetary-gear-set hydraulic power input clutch $C_5$; 4. equal-difference output mechanism; 4-1. equal-difference output shaft; 4-2. first variable transmission ratio output gear pair $i_4$; 4-3. first variable transmission ratio output clutch $C_6$; 4-4. second variable transmission ratio output gear pair $i_5$; 4-5. second variable transmission ratio output clutch $C_7$; 4-6. third variable transmission ratio output clutch $C_8$; 4-7. third variable transmission ratio output gear pair $i_6$; 5. equal-ratio output mechanism; 5-1. fourth variable transmission ratio output gear pair $i_7$; 5-2. fourth variable transmission ratio output clutch $C_9$; 5-3. fifth variable transmission ratio output clutch $C_{10}$; 5-4. fifth variable transmission ratio output gear pair $i_8$; 5-5. sixth variable transmission ratio output clutch $C_{11}$; 5-6. equal-ratio output shaft; 5-7. sixth variable transmission ratio output gear pair $i_9$; 6. coupling mechanism L.

DETAILED DESCRIPTION OF THE EMBODIMENTS

The present disclosure is further described below with reference to the accompanying drawings and specific embodiments, but the protection scope of the present disclosure is not limited thereto.

Embodiments of the present disclosure are described in detail below and are exemplified in the accompanying drawings, wherein the same or similar reference signs indicate the same or similar elements or elements with the same or similar functions. The embodiments described below with reference to the accompanying drawings are exemplary and are intended to explain the present disclosure, instead of limiting the present disclosure.

In the description of the present disclosure, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present disclosure, instead of indicating or implying that the demonstrated device or element is located in a specific direction or is constructed and operated in a specific direction. Therefore, they cannot be construed as limitations to the present disclosure. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present disclosure, "a plurality of" means two or above two, unless otherwise expressly defined.

In the present disclosure, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present disclosure can be understood by persons of ordinary skill in the art according to specific situations.

As shown in FIG. 1, the continuously variable transmission with both equal-difference output and equal-ratio output of the present disclosure includes an input mechanism 1, a hydraulic transmission mechanism 2, a planetary-gear-set convergence mechanism 3, an equal-difference output mechanism 4, an equal-ratio output mechanism 5, a coupling mechanism 6, a clutch assembly, and a brake B 2-4.

The input mechanism 1 includes an input shaft 1-1, a hydraulic path input clutch $C_1$ 1-2, a hydraulic path input gear pair $i_1$ 1-3, a first mechanical path input gear pair $i_2$ 1-4, a first mechanical path input clutch $C_2$ 1-5, a second mechanical path input gear pair $i_3$ 1-6, and a second mechanical path input clutch $C_3$ 1-7. The input shaft 1-1 is a front power output shaft, that is, front PTO and an end of the input shaft 1-1 is connected to a power take-off device for operation. The hydraulic path input clutch $C_1$ 1-2 is used for selectively connecting an output end of the input mechanism 1 to an input end of the hydraulic transmission mechanism 2 via the hydraulic path input gear pair $i_1$ 1-3. The first mechanical path input clutch $C_2$ 1-5 is used for selectively connecting the output end of the input mechanism 1 to a planet carrier of a front planetary gear mechanism via the first mechanical path input gear pair $i_2$ 1-4. The second mechanical path input clutch $C_3$ 1-7 is used for selectively connecting the output end of the input mechanism 1 to a ring gear of a rear planetary gear mechanism via the second mechanical path input gear pair $i_3$ 1-6. The engine power is split by the fixed-axis gear pairs. When the hydraulic path input clutch $C_1$ 1-2 is engaged, the engine power is transmitted through the hydraulic path input gear pair $i_1$ 1-3 to the hydraulic transmission mechanism 2. When the first mechanical path input clutch $C_2$ 1-5 or the second mechanical path input clutch $C_3$ 1-7 is engaged, the engine power is transmitted through the first mechanical path input gear pair $i_2$ 1-4 or the second mechanical path input gear pair $i_3$ 1-6 to the planetary-gear-set convergence mechanism 3, respectively.

The hydraulic transmission mechanism 2 includes a hydraulic power input shaft 2-1, a variable displacement pump 2-2, a fixed displacement motor 2-3, the brake B 2-4, and a hydraulic power output shaft 2-5. The hydraulic power input shaft 2-1 is connected to the variable displacement pump 2-2, the variable displacement pump 2-2 is used for driving the fixed displacement motor 2-3, the fixed displacement motor 2-3 is connected to the hydraulic power output shaft 2-5, the hydraulic power output shaft 2-5 is connected to a front planetary-gear-set sun gear 3-7, and the brake B 2-4 is used for selectively connecting the front planetary-gear-set sun gear 3-7 to a fixed member.

The planetary-gear-set convergence mechanism 3 includes a front planetary-gear-set ring gear 3-1, a rear planetary-gear-set ring gear 3-2, a fixed connection clutch $C_4$ 3-3, a front planetary-gear-set planet carrier 3-4, a rear planetary-gear-set planet carrier 3-5, a rear planetary-gear-set sun gear 3-6, the front planetary-gear-set sun gear 3-7, and a rear planetary-gear-set hydraulic power input clutch $C_5$ 3-8. The planetary-gear-set convergence mechanism 3 consists of the front and the rear planetary gear mechanism. The front planetary gear mechanism consists of the front planetary-gear-set ring gear 3-1, the front planetary-gear-set planet carrier 3-4, and the front planetary-gear-set sun gear 3-7. The rear planetary gear mechanism consists of the rear planetary-gear-set ring gear 3-2, the rear planetary-gear-set planet carrier 3-5, and the rear planetary-gear-set sun gear 3-6. The front planetary-gear-set ring gear 3-1 is connected to the rear planetary-gear-set ring gear 3-2. The fixed connection clutch $C_4$ 3-3 is used for selectively connecting the rear planetary-gear-set ring gear 3-2 to the rear planetary-gear-set planet carrier 3-5. The rear planetary-gear-set hydraulic power input clutch $C_5$ 3-8 is used for selectively connecting the hydraulic power output shaft 2-5 of the hydraulic transmission mechanism 2 to the rear planetary-gear-set sun gear 3-6.

The equal-difference output mechanism 4 includes an equal-difference output shaft 4-1, a first variable transmission ratio output gear pair $i_4$ 4-2, a first variable transmission ratio output clutch $C_6$ 4-3, a second variable transmission ratio output gear pair $i_8$ 4-4, a second variable transmission ratio output clutch $C_7$ 4-5, a third variable transmission ratio output clutch $C_8$ 4-6, and a third variable transmission ratio output gear pair $i_6$ 4-7. The first variable transmission ratio output clutch $C_6$ 4-3 is used for selectively connecting the hydraulic power output shaft 2-5 to the equal-difference output shaft 4-1 via the first variable transmission ratio output gear pair $i_4$ 4-2. The second variable transmission ratio output clutch $C_7$ 4-5 is used for selectively connecting the front planetary-gear-set planet carrier 3-4 to the equal-difference output shaft 4-1 via the second variable transmission ratio output gear pair $i_8$ 4-4. The third variable transmission ratio output clutch $C_8$ 4-6 is used for selectively connecting the front planetary-gear-set planet carrier 3-4 to the equal-difference output shaft 4-1 via the third variable transmission ratio output gear pair $i_6$ 4-7. The equal-difference output mechanism 4 is an ordinary gear train output mechanism. When the first variable transmission ratio output clutch $C_6$ 4-3 is engaged, the power is transmitted through the first variable transmission ratio output gear pair $i_4$ 4-2 to the equal-difference output shaft 4-1. When the second variable transmission ratio output clutch $C_7$ 4-5 is engaged, the power after convergence is transmitted through the second variable transmission ratio output gear pair $i_5$ 4-4 to the equal-difference output shaft 4-1. When the third variable transmission ratio output clutch $C_8$ 4-6 is engaged, the power after convergence is transmitted through the third variable transmission ratio output gear pair $i_6$ 4-7 to the equal-difference output shaft 4-1.

The equal-ratio output mechanism 5 includes a fourth variable transmission ratio output gear pair $i_7$ 5-1, a fourth variable transmission ratio output clutch $C_9$ 5-2, a fifth variable transmission ratio output clutch $C_{10}$ 5-3, a fifth variable transmission ratio output gear pair $i_8$ 5-4, a sixth variable transmission ratio output clutch $C_{11}$ 5-5, an equal-ratio output shaft 5-6, and a sixth variable transmission ratio output gear pair $i_9$ 5-7. The fourth variable transmission ratio output clutch $C_9$ 5-2 is used for selectively connecting the rear planetary-gear-set planet carrier 3-5 to the equal-ratio output shaft 5-6 via the fourth variable transmission ratio output gear pair $i_7$ 5-1. The fifth variable transmission ratio output clutch $C_{10}$ 5-3 is used for selectively connecting the rear planetary-gear-set planet carrier 3-5 to the equal-ratio output shaft 5-6 via the fifth variable transmission ratio output gear pair $i_8$ 5-4. The sixth variable transmission ratio output clutch $C_{11}$ 5-5 is used for selectively connecting the hydraulic power output shaft 2-5 to the equal-ratio output shaft 5-6 via the sixth variable transmission ratio output gear pair $i_9$ 5-7. The equal-ratio output mechanism 5 is an ordinary gear train output mechanism. When the fourth variable transmission ratio output clutch $C_9$ 5-2 is engaged, the power after convergence is transmitted through the fourth variable transmission ratio output gear pair $i_7$ 5-1 to the equal-ratio output shaft 5-6. When the fifth variable transmission ratio output clutch $C_{10}$ 5-3 is engaged, the power after convergence is transmitted through the fifth variable transmission ratio output gear pair $i_8$ 5-4 to the equal-ratio output shaft 5-6. When the sixth variable transmission ratio output clutch $C_{11}$ 5-5 is engaged, the power is transmitted through the sixth variable transmission ratio output gear pair $i_9$ 5-7 to the equal-ratio output shaft 5-6. The coupling mechanism 6 is used for selectively connecting the equal-difference output shaft 4-1 to the equal-ratio output shaft 5-6, to realize hybrid equal-difference continuous and equal-ratio continuous outputs, thereby extending the speed regulation range of the transmission device.

The switching among multiple transmission modes including hydraulic transmission H, mechanical transmission M, and hydro-mechanical transmission HIM between the input mechanism 1 and the equal-difference output shaft 4-1 and/or between the input mechanism 1 and the equal-ratio output shaft 5-6 can be implemented by selectively engaging the corresponding clutch assemblies and brakes while disengaging the other clutch assemblies and brakes and selectively adjusting the displacement ratio of the hydraulic transmission mechanism 2. The engagement state of the execution components in each transmission mode is shown in Table 1.

TABLE 1

Engagement state of mode-switching components

| Type | Gear | $C_1$ | $C_2$ | $C_3$ | $C_4$ | $C_5$ | $C_6$ | $C_7$ | $C_8$ | $C_9$ | $C_{10}$ | $C_{11}$ | B | L |
|---|---|---|---|---|---|---|---|---|---|---|---|---|---|---|
| Mechanical gear | $M_1$ |  | ▲ |  |  |  |  | ▲ |  |  |  |  |  |  |
|  | $M_2$ |  | ▲ |  |  |  |  |  | ▲ |  |  |  | ▲ |  |
|  | $M_3$ |  | ▲ |  | ▲ |  |  |  |  | ▲ |  |  | ▲ |  |
|  | $M_4$ |  | ▲ |  | ▲ |  |  |  |  |  | ▲ |  | ▲ |  |
|  | $M_5$ |  | ▲ |  |  | ▲ |  |  |  | ▲ |  |  | ▲ |  |
|  | $M_6$ |  | ▲ |  |  | ▲ |  |  |  |  | ▲ |  | ▲ |  |
|  | $M_7$ |  |  | ▲ |  |  |  | ▲ |  |  |  |  | ▲ |  |
|  | $M_8$ |  |  | ▲ |  |  |  |  | ▲ |  |  |  | ▲ |  |
|  | $M_9$ |  |  | ▲ | ▲ |  |  |  |  | ▲ |  |  | ▲ |  |
|  | $M_{10}$ |  |  | ▲ | ▲ |  |  |  |  |  | ▲ |  | ▲ |  |
|  | $M_{11}$ |  |  | ▲ |  | ▲ |  |  |  | ▲ |  |  | ▲ |  |
|  | $M_{12}$ |  |  | ▲ |  | ▲ |  |  |  |  | ▲ |  | ▲ |  |
| Hydraulic gear | $H_1$ | ▲ |  |  |  |  | ▲ |  |  |  |  |  |  |  |
|  | $H_2$ | ▲ |  |  |  |  |  |  |  |  |  | ▲ |  |  |
|  | $H_3$ | ▲ |  |  |  |  |  |  |  |  |  | ▲ |  | ▲ |
| Hydro-mechanical gear | $HM_f$ | ▲ |  | ▲ |  |  |  | ▲ |  |  |  |  |  |  |
|  | $HM_z$ | ▲ |  | ▲ |  |  |  |  | ▲ |  |  |  |  |  |
|  | $HM_1$ | ▲ |  | ▲ | ▲ |  |  |  |  | ▲ |  |  |  |  |
|  | $HM_2$ | ▲ | ▲ |  | ▲ |  |  |  |  | ▲ |  |  |  |  |
|  | $HM_3$ | ▲ | ▲ |  | ▲ |  |  |  |  |  | ▲ |  |  |  |
|  | $HM_4$ | ▲ | ▲ |  | ▲ |  |  |  |  | ▲ |  |  |  |  |
|  | $HM_5$ | ▲ | ▲ |  |  | ▲ |  |  |  | ▲ |  |  |  | ▲ |
|  | $HM_6$ | ▲ | ▲ |  |  | ▲ |  |  |  |  | ▲ |  |  | ▲ |

Figure 2:
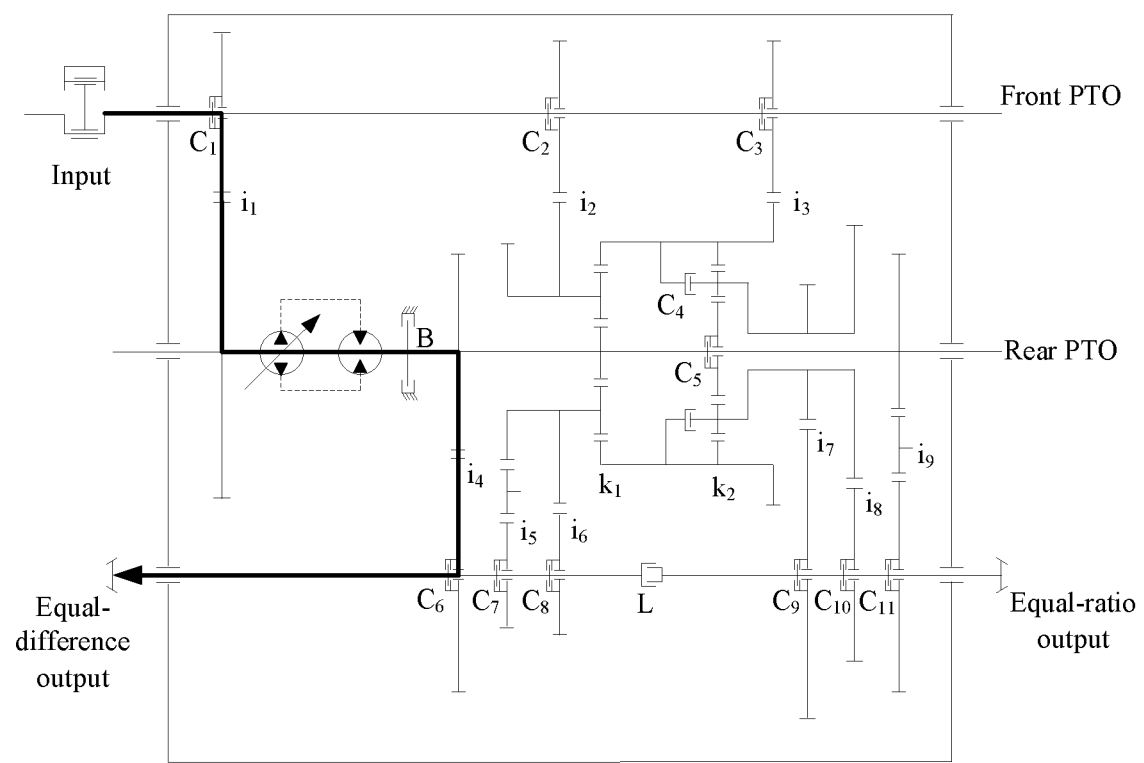
FIG. 2 is a diagram showing the power flow in hydraulic transmission $H_1$.

FIG. 2 is a diagram showing the power flow in the hydraulic transmission $H_1$. When only the hydraulic path input clutch $C_1$ 1-2 and the first variable transmission ratio output clutch $C_6$ 4-3 are engaged, the engine power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the power output by the fixed displacement motor 2-3 passes through the first variable transmission ratio output gear pair $i_4$ 4-2 and is output from the equal-difference output shaft 4-1.

Figure 3:
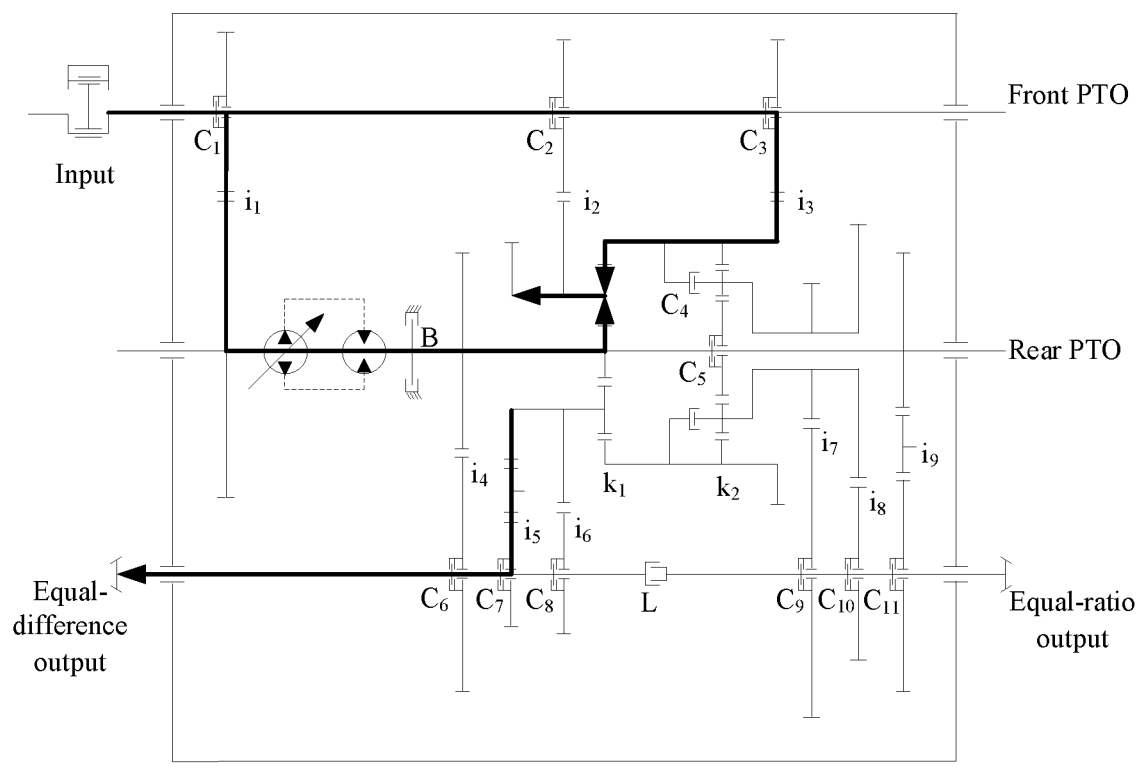
FIG. 3 is a diagram showing the power flow in hydro-mechanical transmission $HM_f$.

FIG. 3 is a diagram showing the power flow in the hydro-mechanical transmission $HM_f$. When only the hydraulic path input clutch $C_1$ 1-2, the second mechanical path input clutch $C_3$ 1-7, and the second variable transmission ratio output clutch $C_7$ 4-5 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the front planetary-gear-set sun gear 3-7. The other part of the power is transmitted through the second mechanical path input gear pair $i_3$ 1-6 to the front planetary-gear-set ring gear 3-1. The two parts of the power are converged at the front planetary-gear-set planet carrier 3-4. After that, the power passes through the second variable transmission ratio output gear pair $i_5$ 4-4 and is output from the equal-difference output shaft 4-1.

Figure 4:
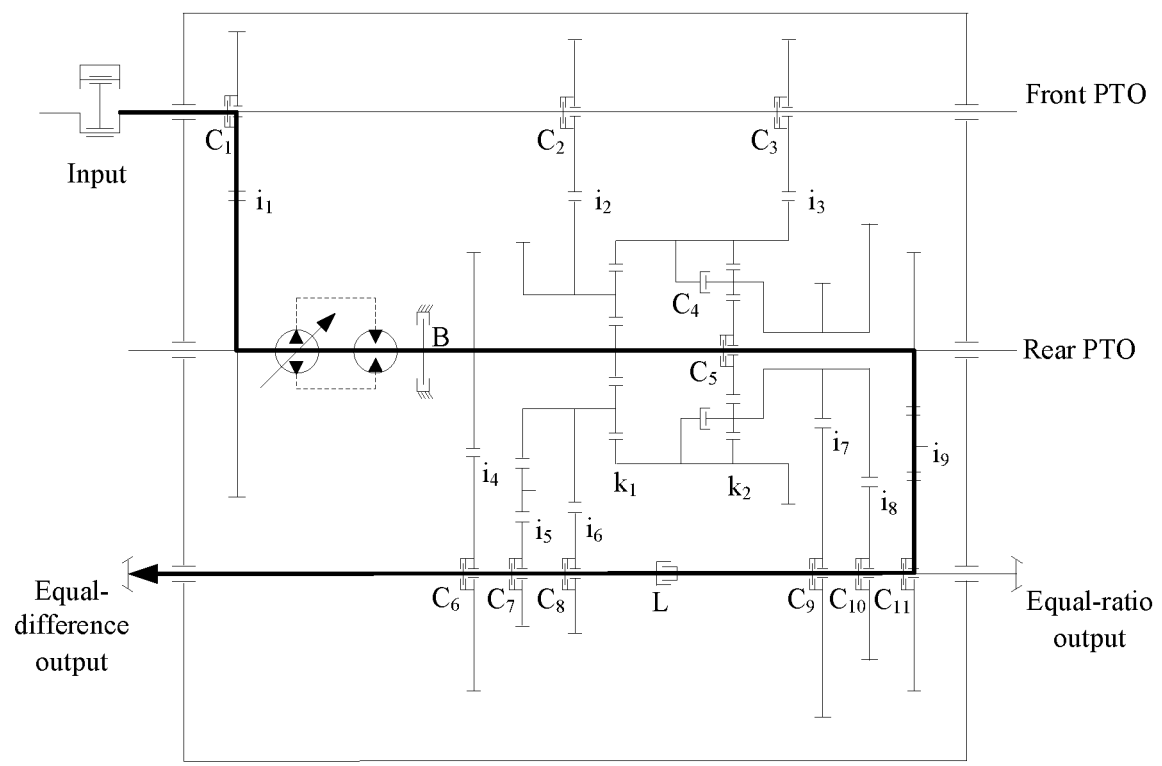
FIG. 4 is a diagram showing the power flow in hydraulic transmission $H_3$.

FIG. 4 is a diagram showing the power flow in the hydraulic transmission $H_3$. When only the hydraulic path input clutch $C_1$ 1-2, the sixth variable transmission ratio output clutch $C_{11}$ 5-5, and the coupling mechanism L 6 are engaged, the engine power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, the fixed displacement motor 2-3 transmits power to the hydraulic power output shaft 2-5, and the power passes through the sixth variable transmission ratio output gear pair $i_9$ 5-7 and is output from the equal-difference output shaft 4-1 and the equal-ratio output shaft 5-6 via the coupling mechanism L 6.

Figure 5:
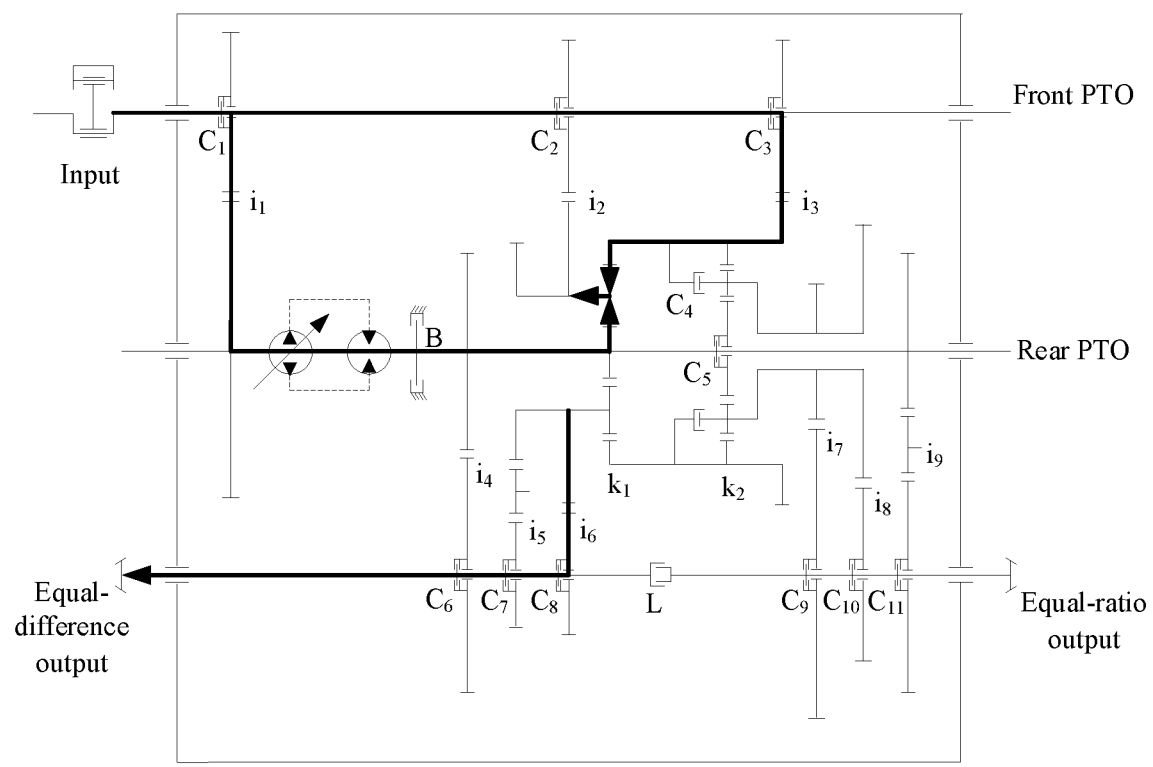
FIG. 5 is a diagram showing the power flow in hydro-mechanical transmission $HM_r$.

FIG. 5 is a diagram showing the power flow in the hydro-mechanical transmission $HM_z$. When only the hydraulic path input clutch $C_1$ 1-2, the second mechanical path input clutch $C_3$ 1-7, and the third variable transmission ratio output clutch $C_8$ 4-6 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the front planetary-gear-set sun gear 3-7. The other part of the power is transmitted through the second mechanical path input gear pair $i_3$ 1-6 to the front planetary-gear-set ring gear 3-1. The two parts of the power are converged at the front planetary-gear-set planet carrier 3-4. After that, the power passes through the third variable transmission ratio output gear pair $i_6$ 4-7 and is output from the equal-difference output shaft 4-1.

Figure 6:
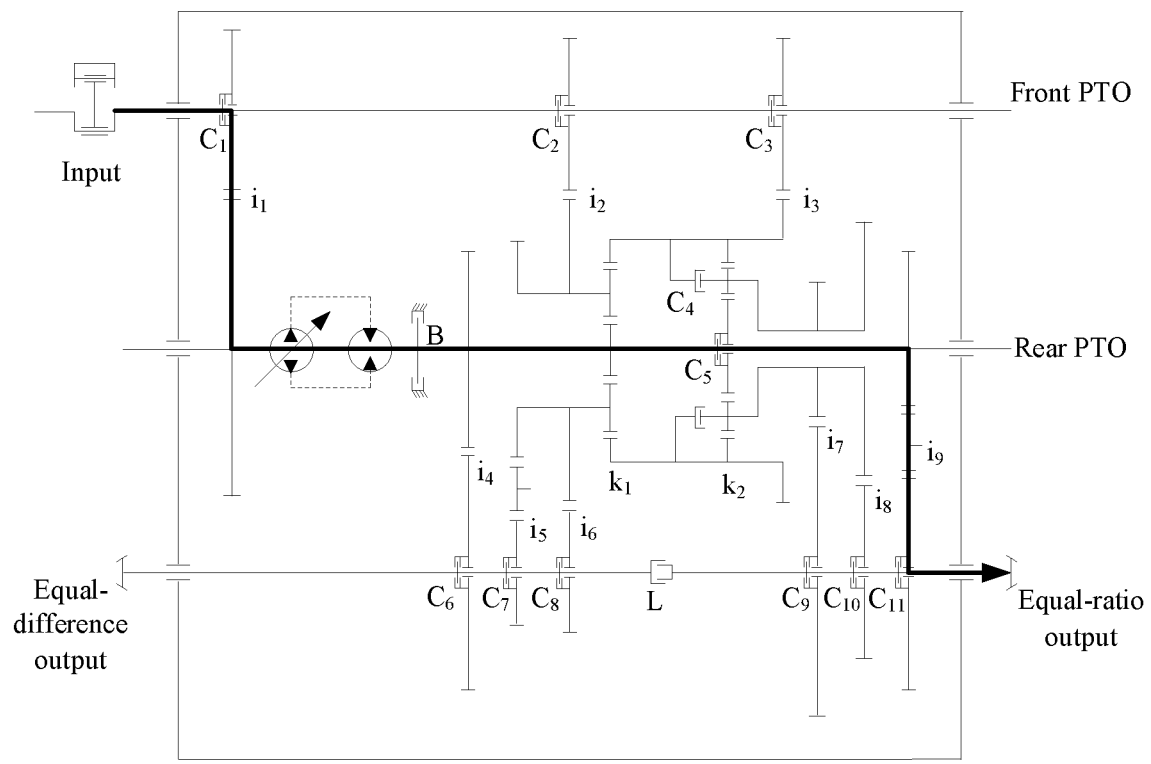
FIG. 6 is a diagram showing the power flow in hydraulic transmission $H_2$.

FIG. 6 is a diagram showing the power flow in the hydraulic transmission $H_2$. When only the hydraulic path input clutch $C_1$ 1-2 and the sixth variable transmission ratio output clutch $C_{11}$ 5-5 are engaged, the engine power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, the fixed displacement motor 2-3 transmits power to the hydraulic power output shaft 2-5, and the power passes through the sixth variable transmission ratio output gear pair $i_9$ 5-7 and is output from the equal-ratio output shaft 5-6.

Figure 7:
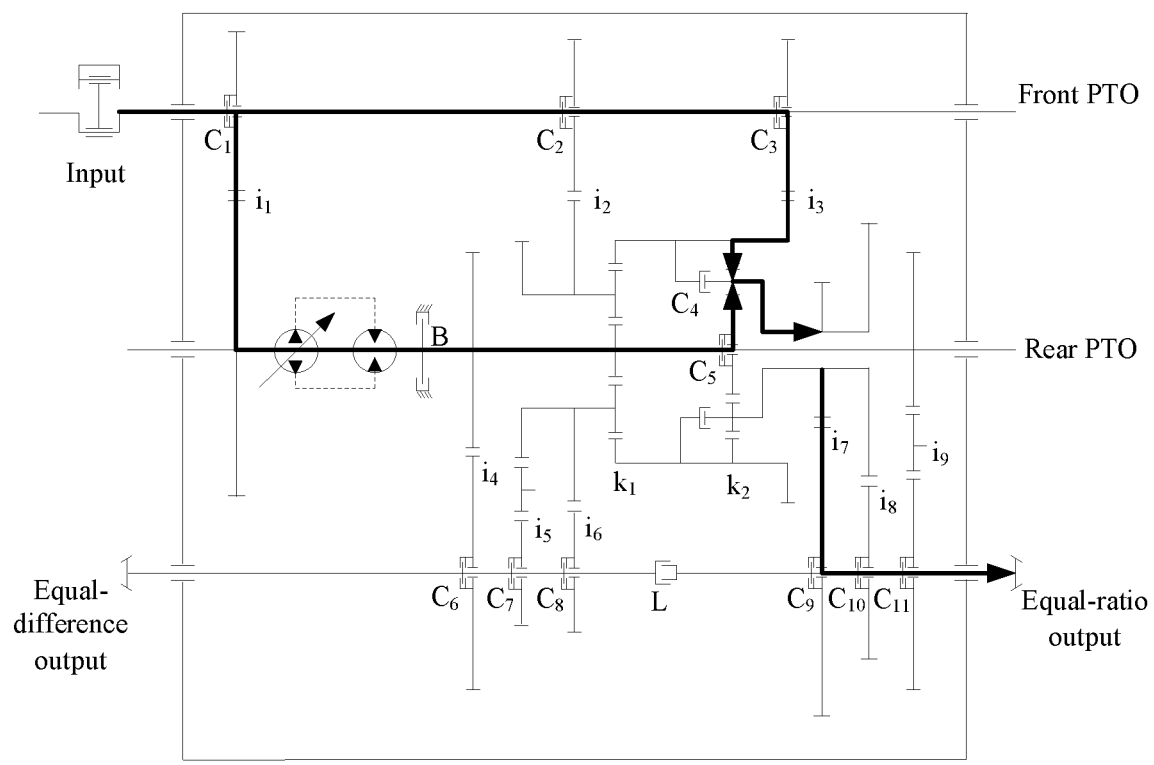
FIG. 7 is a diagram showing the power flow in hydro-mechanical transmission $HM_1$.

FIG. 7 is a diagram showing the power flow in the hydro-mechanical transmission $HM_1$. When only the hydraulic path input clutch $C_1$ 1-2, the second mechanical path input clutch $C_3$ 1-7, the rear planetary-gear-set hydraulic power input clutch $C_5$ 3-8, and the fourth variable transmission ratio output clutch $C_9$ 5-2 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the rear planetary-gear-set sun gear 3-6. The other part of the power is transmitted through the second mechanical path input gear pair $i_3$ 1-6 to the rear planetary-gear-set ring gear 3-2. The two parts of the power are converged at the rear planetary-gear-set planet carrier 3-5. After that, the power passes through the fourth variable transmission ratio output gear pair $i_7$ 5-1 and is output from the equal-ratio output shaft 5-6.

Figure 8:
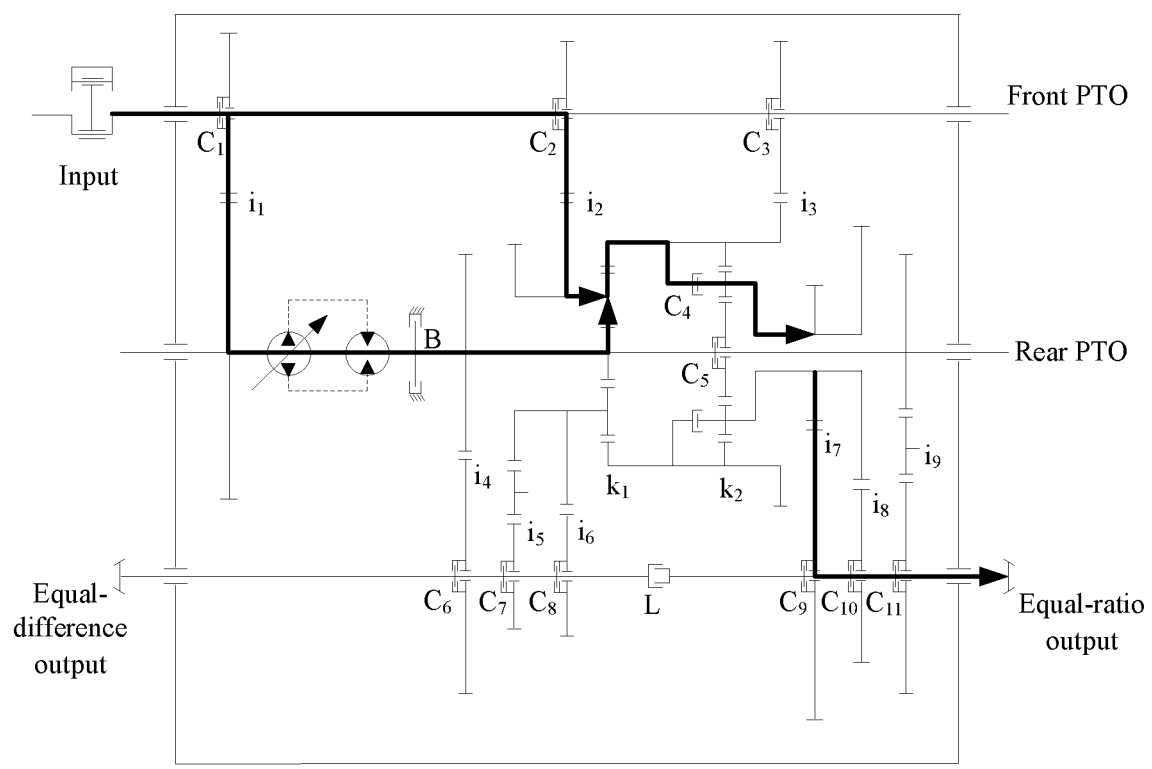
FIG. 8 is a diagram showing the power flow in hydro-mechanical transmission $HM_2$.

FIG. 8 is a diagram showing the power flow in the hydro-mechanical transmission $HM_2$. When only the hydraulic path input clutch $C_1$ 1-2, the first mechanical path input clutch $C_2$ 1-5, the fixed connection clutch $C_4$ 3-3, and the fourth variable transmission ratio output clutch $C_9$ 5-2 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the front planetary-gear-set sun gear 3-7. The other part of the power is transmitted through the first mechanical path input gear pair $i_2$ 1-4 to the front planetary-gear-set planet carrier 3-4. The two parts of the power are converged at the front planetary-gear-set ring gear 3-1. Since the fixed connection clutch $C_4$ 3-3 is engaged, the rear planetary gear set is fixedly connected as a whole, and the power passes through the fourth variable transmission ratio output gear pair $i_7$ 5-1 and is output from the equal-ratio output shaft 5-6.

Figure 9:
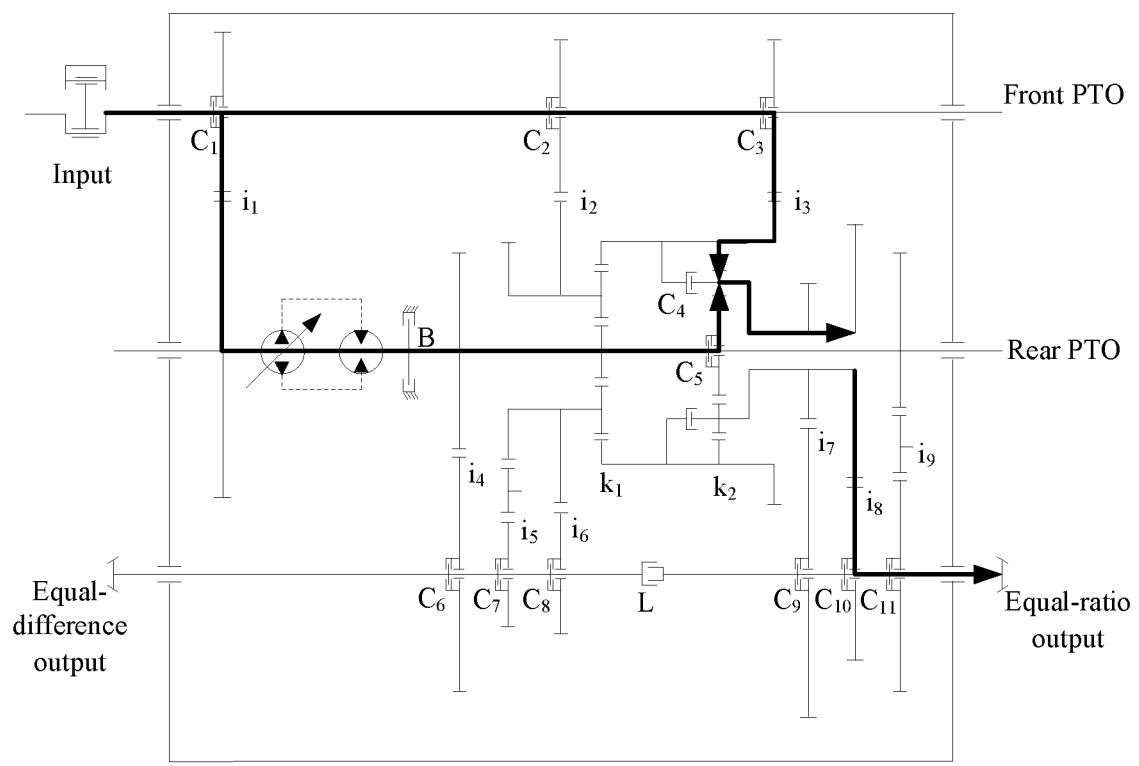
FIG. 9 is a diagram showing the power flow in hydro-mechanical transmission $HM_3$.

FIG. 9 is a diagram showing the power flow in the hydro-mechanical transmission $HM_3$. When only the hydraulic path input clutch $C_1$ 1-2, the second mechanical path input clutch $C_3$ 1-7, the rear planetary-gear-set hydraulic power input clutch $C_5$ 3-8, and the fifth variable transmission ratio output clutch $C_{10}$ 5-3 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the rear planetary-gear-set sun gear 3-6. The other part of the power is transmitted through the second mechanical path input gear pair $i_3$ 1-6 to the rear planetary-gear-set ring gear 3-2. The two parts of the power are converged at the rear planetary-gear-set planet carrier 3-5. After that, the power passes through the fifth variable transmission ratio output gear pair $i_8$ 5-4 and is output from the equal-ratio output shaft 5-6.

Figure 10:
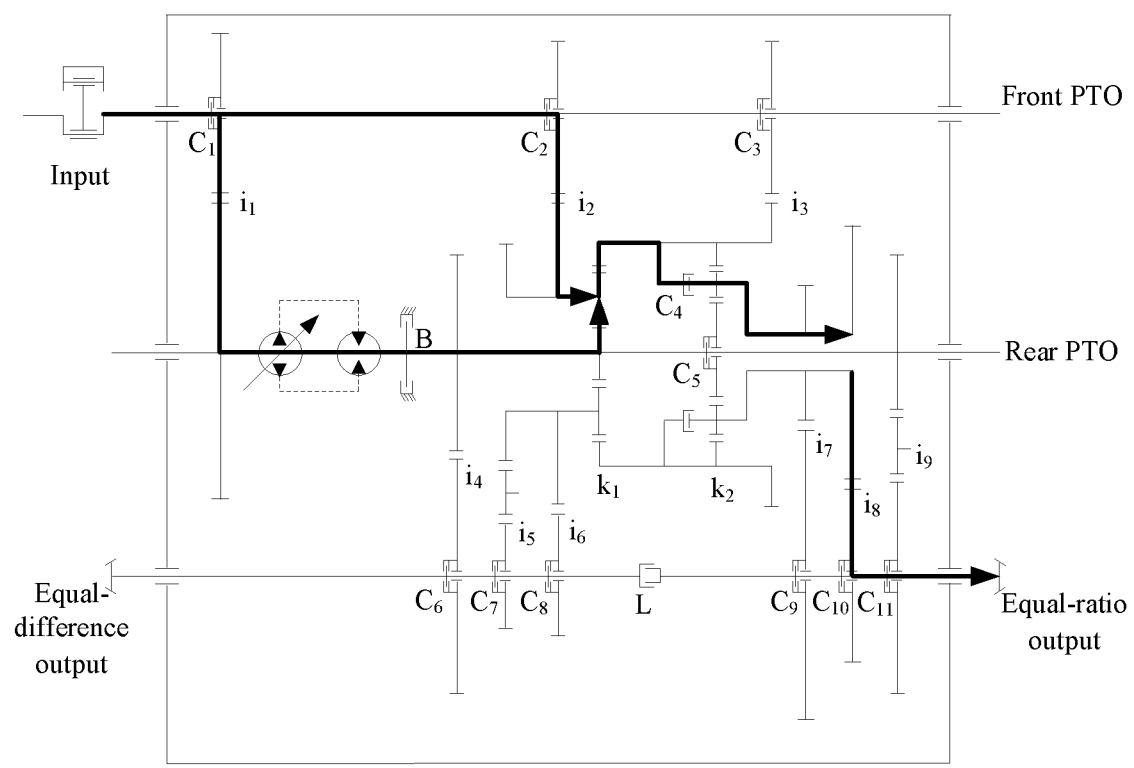
FIG. 10 is a diagram showing the power flow in hydro-mechanical transmission $HM_4$.

FIG. 10 is a diagram showing the power flow in the hydro-mechanical transmission $HM_4$. When only the hydraulic path input clutch $C_1$ 1-2, the first mechanical path input clutch $C_2$ 1-5, the fixed connection clutch $C_4$ 3-3, and the fifth variable transmission ratio output clutch $C_{10}$ 5-3 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the front planetary-gear-set sun gear 3-7. The other part of the power is transmitted through the first mechanical path input gear pair $i_2$ 1-4 to the front planetary-gear-set planet carrier 3-4. The two parts of the power are converged at the front planetary-gear-set ring gear 3-1. Since the fixed connection clutch $C_4$ 3-3 is engaged, the rear planetary gear set is fixedly connected as a whole, and the power passes through the fifth variable transmission ratio output gear pair $i_8$ 5-4 and is output from the equal-ratio output shaft 5-6.

Figure 11:
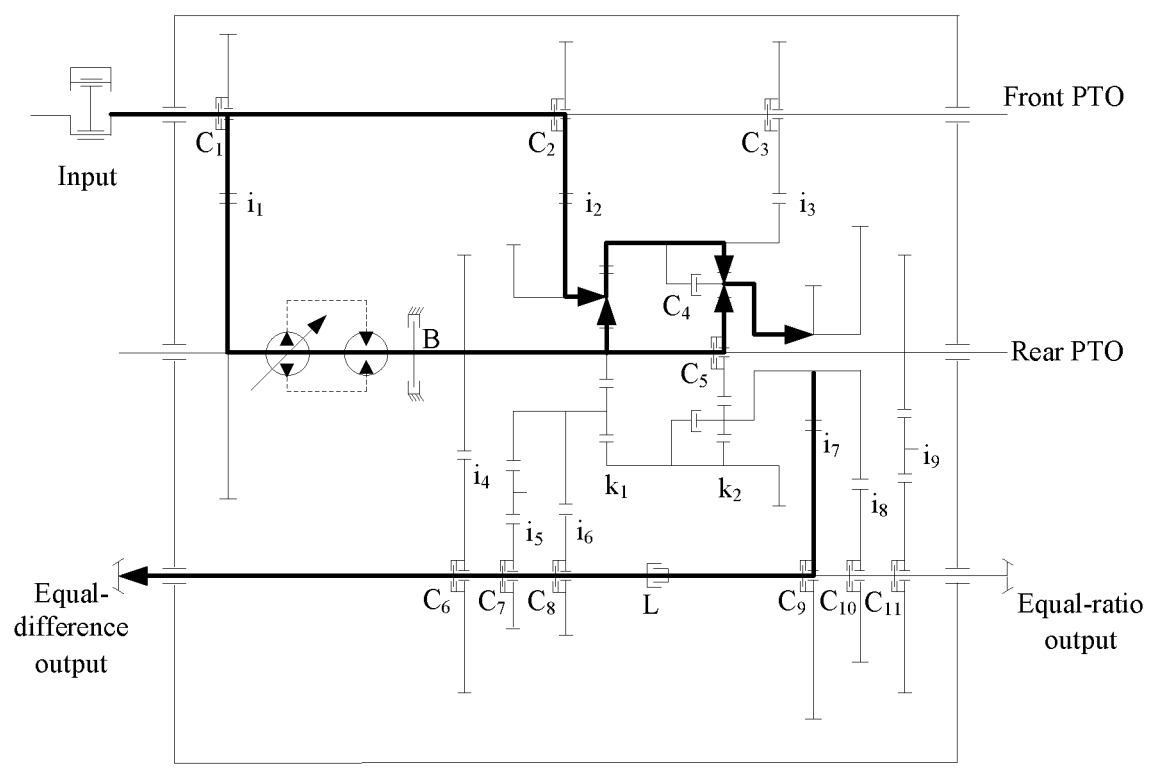
FIG. 11 is a diagram showing the power flow in hydro-mechanical transmission $HM_5$.

FIG. 11 is a diagram showing the power flow in the hydro-mechanical transmission $HM_5$. When only the hydraulic path input clutch $C_1$ 1-2, the first mechanical path input clutch $C_2$ 1-5, the rear planetary-gear-set hydraulic power input clutch $C_5$ 3-8, the fourth variable transmission ratio output clutch $C_9$ 5-2, and the coupling mechanism L 6 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the front planetary-gear-set sun gear 3-7. The other part of the power is transmitted through the first mechanical path input gear pair $i_2$ 1-4 to the front planetary-gear-set planet carrier 3-4. The two parts of the power are converged and output through the front planetary-gear-set ring gear 3-1 to the rear planetary-gear-set ring gear 3-2. Since the rear planetary-gear-set hydraulic power input clutch $C_5$ 3-8 is engaged, the hydraulic path power is transmitted to the rear planetary-gear-set sun gear 3-6. The two parts of the power are converged at the rear planetary-gear-set planet carrier 3-5. After that, the power passes through the fourth variable transmission ratio output gear pair $i_7$ 5-1 and is output from the equal-difference output shaft 4-1 and the equal-ratio output shaft 5-6 via the coupling mechanism L 6.

Figure 12:
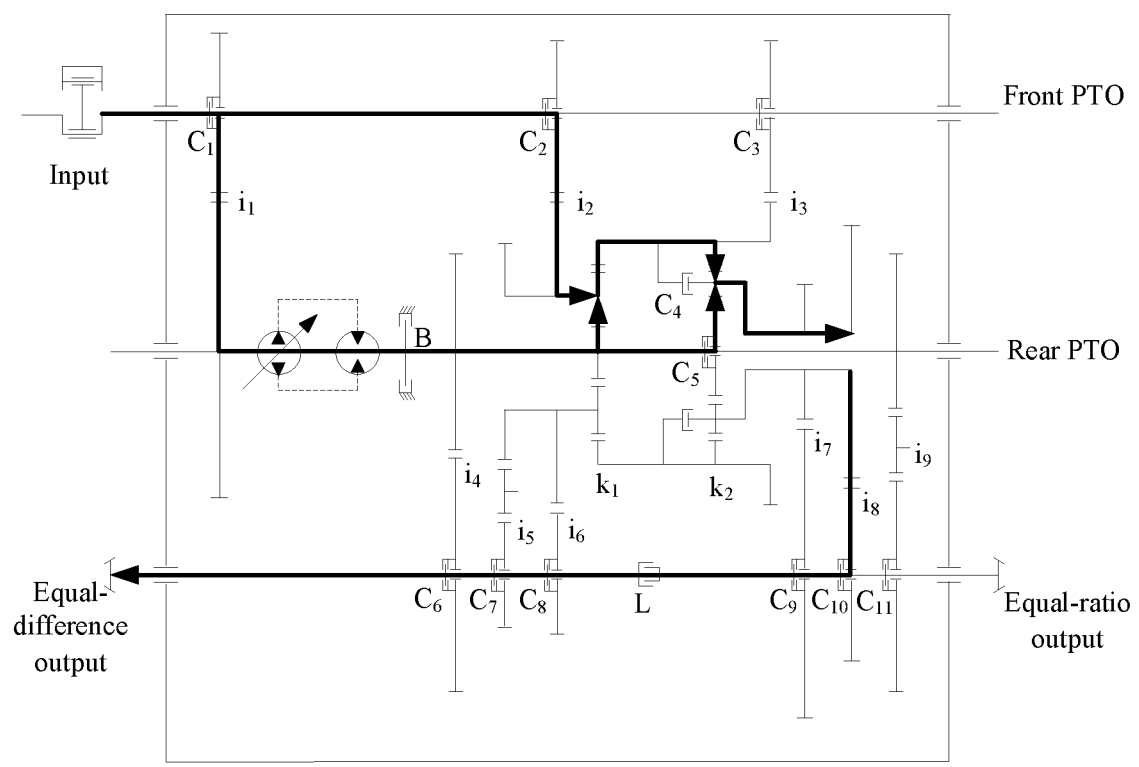
FIG. 12 is a diagram showing the power flow in hydro-mechanical transmission $HM_6$.

FIG. 12 is a diagram showing the power flow in the hydro-mechanical transmission $HM_6$. When only the hydraulic path input clutch $C_1$ 1-2, the first mechanical path input clutch $C_2$ 1-5, the rear planetary-gear-set hydraulic power input clutch $C_5$ 3-8, the fourth variable transmission ratio output clutch $C_{10}$ 5-3, and the coupling mechanism L 6 are engaged, the engine power passes through the input shaft 1-1 and is split into two parts. One part of the power is transmitted through the hydraulic path input gear pair $i_1$ 1-3 to the hydraulic power input shaft 2-1, the hydraulic power input shaft 2-1 is connected to the variable displacement pump 2-2, the variable displacement pump 2-2 drives the fixed displacement motor 2-3, the continuously variable transmission is realized by adjusting the displacement ratio of the variable displacement pump 2-2, and the fixed displacement motor 2-3 outputs power to the front planetary-gear-set sun gear 3-7. The other part of the power is transmitted through the first mechanical path input gear pair $i_2$ 1-4 to the front planetary-gear-set planet carrier 3-4. The two parts of the power are converged and output through the front planetary-gear-set ring gear 3-1 to the rear planetary-gear-set ring gear 3-2. Since the rear planetary-gear-set hydraulic power input clutch $C_5$ 3-8 is engaged, the hydraulic path power is transmitted to the rear planetary-gear-set sun gear 3-6. The two parts of the power are converged at the rear planetary-gear-set planet carrier 3-5. After that, the power passes through the fifth variable transmission ratio output gear pair $i_8$ 5-4 and is output from the equal-difference output shaft 4-1 and the equal-ratio output shaft 5-6 via the coupling mechanism L 6.

The hydro-mechanical continuously variable transmission can be divided into two stages, three stages, four stages, and the like. If more continuous stages are provided, the mechanisms and operations become more complex, but the hydraulic power is increased by larger multiples and the transmission efficiency is also higher.

The speed regulation ranges of the hydraulic stage and the hydro-mechanical stage are related to the displacement ratio. The adjustment range of the displacement ratio of the two-way variable displacement pump is [−1,1]. The displacement ratio changes from −1 to 1 in a forward stroke and changes from 1 to −1 in a reverse stroke. The displacement ratio being −1 or 1 is corresponding to the beginning or the end of each stage. Through alternate switching between the forward and reverse strokes, small stepless speed regulation intervals corresponding to the stages are joined to realize global stepless speed regulation and thus extend the speed regulation range.

The equal-difference continuously variable transmission, generally consisting of hydraulic stages and hydro-mechanical stages, requires that the difference between the output speeds at the beginning and the end of each stage is equal and the stages are linked to each other. For example, if the equal-difference continuous transmission consists of i stages (i>=2), the requirement of continuity must be met first, that is, the output speed at the end of the first stage is equal to the output speed at the beginning of the second stage, and the rest can be deduced in the same manner till the output speed at the end of the $(i-1)^{th}$ stage is equal to the output speed at the beginning of the $i^{th}$ stage. Besides, the requirement of equal difference is met, that is, the difference between the output speeds at the end and the beginning of each stage is equal. Therefore, the equal-difference continuously variable transmission is realized.

The equal-ratio continuous output generally consists of multiple hydro-mechanical stages but no hydraulic stage, so that the situation where the output speed at the beginning of a stage is 0 does not exist. It requires that the ratio between the speed at the end and the speed at the beginning of each stage is a common ratio and the stages are linked to each other. For example, if the equal-ratio continuous transmission consists of i stages (i>=2), the requirement of continuity must be met first, that is, the output speed at the end of the first stage is equal to the output speed at the beginning of the second stage, and the rest can be deduced in the same manner till the output speed at the end of the $(i-1)^{th}$ stage is equal to the output speed at the beginning of the $i^{th}$ stage. Besides, the requirement of equal ratio is met, that is, the ratio between the output speeds at the end and the beginning of each stage is equal. Therefore, the equal-ratio continuously variable transmission is realized.

Appropriate hydraulic stages and hydro-mechanical stages are selected to form equal-ratio four-stage continuous output and two modes of equal-difference two-stage continuous output. It should be noted that, in the equal-ratio four-stage continuous output, the hydraulic stage is only used for zero-speed startup and the reverse gear and is thus not included in the total number of stages in the equal-ratio continuous output; the hybrid output stage is a hydro-mechanical stage provided when the coupling mechanism is engaged and can be selected according to the actual situation in the case of hybrid equal-difference output and equal-ratio output. The details are shown in Table 2 below.

TABLE 2

Equal-difference two-stage stepless shift and equal-ratio four-stage stepless shift outputs

| Type | Gear | Engaged components | Rotation speed relationship | Displacement ratio variation range |
|---|---|---|---|---|
| Equal-difference two-stage mode I | $H_1$ | $C_1, C_6$ | $n_0 = \dfrac{e}{i_1 i_4} n_e$ | [−1, 1] |
| | $HM_f$ | $C_1, C_3, C_7$ | $n_0 = -\dfrac{\dfrac{k_1}{i_3}+\dfrac{e}{i_1}}{(1+k_1)i_5} n_e$ | [1, −1] |
| Equal-difference two-stage mode II | $H_3$ | $C_1, C_{11}, L$ | $n_0 = -\dfrac{e}{i_1 i_9} n_e$ | [1, −1] |
| | $HM_z$ | $C_1, C_3, C_8$ | $n_0 = \dfrac{\dfrac{k_1}{i_3}+\dfrac{e}{i_1}}{(1+k_1)i_6} n_e$ | [−1, 1] |
| Equal-ratio four-stage | $H_2$ | $C_1, C_{11}$ | $n_0 = -\dfrac{e}{i_1 i_9} n_e$ | [1, −1] |
| | $HM_1$ | $C_1, C_3, C_5, C_9$ | $n_0 = \dfrac{\dfrac{k_2}{i_3}+\dfrac{e}{i_1}}{(1+k_2)i_7} n_e$ | [−1, 1] |
| | $HM_2$ | $C_1, C_2, C_4, C_9$ | $n_0 = \dfrac{\dfrac{1+k_1}{i_2}-\dfrac{e}{i_1}}{k_1 i_7} n_e$ | [1, −1] |

TABLE 2-continued

Equal-difference two-stage stepless shift and equal-ratio four-stage stepless shift outputs

| Type | Gear | Engaged components | Rotation speed relationship | Displacement ratio variation range |
|---|---|---|---|---|
| | $HM_3$ | $C_1, C_3, C_5, C_{10}$ | $n_0 = \dfrac{\dfrac{k_2}{i_3}+\dfrac{e}{i_1}}{(1+k_2)i_8} n_e$ | [−1, 1] |
| | $HM_4$ | $C_1, C_2, C_4, C_{10}$ | $n_0 = \dfrac{\dfrac{1+k_1}{i_2}-\dfrac{e}{i_1}}{k_1 i_8} n_e$ | [1, −1] |
| Hybrid output stage | $HM_5$ | $C_1, C_2, C_5, C_9, L$ | $n_0 = \dfrac{\dfrac{(1+k_1)}{i_2}-\dfrac{e}{i_1}}{k_1} k_2 + \dfrac{e}{i_1} n_e$ | [1, −1] |
| | $HM_6$ | $C_1, C_2, C_5, C_{10}, L$ | $n_0 = \dfrac{\dfrac{(1+k_1)}{(i_2)}-\dfrac{e}{i_1}}{k_1} k_2 + \dfrac{e}{i_1} n_e$ | [1, −1] |

When $$\frac{i_4}{i_5} = 1 + k_1 \text{ and } \frac{i_3}{i_1} = \frac{k_1}{2},$$

equal-difference two-stage stepless shift is formed between the hydraulic transmission $H_1$ and the hydro-mechanical transmission $HM_f$ by adjusting the displacement ratio of the hydraulic transmission mechanism 2 and selectively controlling the clutch assembly, wherein $k_1$ is a planetary gear characteristic parameter of the front planetary gear mechanism. When output in the equal-difference two-stage mode I is adopted, zero-speed startup is carried out at the pure hydraulic transmission stage $H_1$ and the output speed increases linearly with the increase of the displacement ratio e of the variable displacement pump. When the displacement ratio e changes from 0 to 1, the output speed in the hydraulic transmission $H_1$ reaches the positive maximum value from zero. In the reverse gear working condition, that is, when the displacement ratio changes from 0 to −1, the hydraulic transmission $H_1$ reaches the negative maximum value and can be synchronously shifted to the hydro-mechanical transmission $HM_f$. As the displacement ratio e of the variable displacement pump changes from −1 to 1, the output speed continues to increase negatively.

When $$\frac{i_9}{i_6} = 1 + k_1 \text{ and } \frac{i_3}{i_1} = \frac{k_1}{2},$$

equal-difference two-stage stepless shift is formed between the hydraulic transmission $H_3$ and the hydro-mechanical transmission $HM_z$ by adjusting the displacement ratio of the hydraulic transmission mechanism 2 and selectively controlling the clutch assembly, wherein $k_1$ is the planetary gear characteristic parameter of the front planetary gear mechanism. When output in the equal-difference two-stage mode II is adopted, zero-speed startup is carried out at the pure hydraulic transmission $H_3$ and the output speed increases linearly with the decrease of the displacement ratio e of the variable displacement pump. When the displacement ratio e changes from 0 to −1, the output speed in the hydraulic transmission $H_3$ reaches the positive maximum value from zero and can be synchronously shifted to the hydro-mechanical transmission $HM_z$. As the displacement ratio e of the variable displacement pump changes from −1 to 1, the output speed continues to increase positively. In the reverse gear working condition, that is, when the displacement ratio changes from 0 to 1, the stage $H_3$ reaches the negative maximum value.

The equal-difference continuous transmission has a constant maximum output torque and an evenly changing speed and is mostly used for a vehicle steering mechanism. The equal-difference mode I has a wider negative speed regulation interval than the equal-difference mode II, the equal-difference mode II has a wider positive speed regulation interval than the equal-difference mode I, and an appropriate equal-difference mode can be selected according to actual needs during the application process.

When $$\frac{\frac{k_2}{i_3}+\frac{1}{i_1}}{\frac{k_2}{i_3}-\frac{1}{i_1}} = \frac{\frac{1+k_1}{i_2}+\frac{1}{i_1}}{\frac{i+k_1}{i_2}-\frac{1}{i_1}}, \frac{\frac{k_2}{i_3}+\frac{1}{i_1}}{(1+k_2)} = \frac{\frac{1+k_1}{i_2}-\frac{1}{i_1}}{k_1},$$

and $\frac{\frac{1+k_1}{i_2}+\frac{1}{i_1}}{k_1 i_7} = \frac{\frac{k_2}{i_3}-\frac{1}{i_1}}{(1+k_2)i_8}$, equal-ratio four-stage stepless shift is formed between the hydraulic transmission $H_2$, the hydro-mechanical transmission $HM_1$, the hydro-mechanical transmission $HM_2$, the hydro-mechanical transmission $HM_3$, and the hydro-mechanical transmission $HM_4$ by adjusting the displacement ratio of the hydraulic transmission mechanism 2 and selectively controlling the clutch assembly, wherein $k_1$ is the planetary gear characteristic parameter of the front planetary gear mechanism and $k_2$ is a planetary gear characteristic parameter of the rear planetary gear mechanism. When the equal-ratio four-stage output is adopted, zero-speed startup is carried out at the pure hydraulic transmission stage $H_2$. As the displacement ratio e of the variable displacement pump changes from 0 to −1, the output speed increases from 0 to the positive maximum value and the transmission can be synchronously shifted to the first hydro-mechanical stage $HM_1$. As the displacement ratio e of the variable displacement pump changes from −1 to 1, the output speed at the beginning of the stage is multiplied by the common ratio to obtain the output speed at the end of the stage, and the transmission can be synchronously shifted to the second hydro-mechanical stage $HM_2$. As the displacement ratio e of the variable displacement pump changes from 1 to −1, the output speed at the beginning of the stage is multiplied by the common ratio to obtain the output speed at the end of the stage, and the transmission can be synchronously shifted to the third hydro-mechanical stage $HM_3$. As the displacement ratio e of the variable displacement pump changes from −1 to 1, the output speed at the beginning of the stage is multiplied by the common ratio to obtain the output speed at the end of the stage, and the transmission can be synchronously shifted to the fourth hydro-mechanical stage $HM_4$. As the displacement ratio e of the variable displacement pump changes from 1 to −1, the output speed at the beginning of the stage is multiplied by the common ratio to obtain the output speed at the end of the stage. The reverse gear working condition is also realized by the pure hydraulic stage $H_2$. As the displacement ratio e of the variable displacement pump changes from 0 to 1, the output speed changes from 0 to the negative maximum value.

The equal-ratio continuous transmission generally has a constant maximum output power, so that a large torque is obtained in the low-speed stage and a small torque is obtained in the high-speed stage, which facilitates variable-speed propulsion and is applied to vehicle transmission mechanisms.

When the coupling mechanism L is engaged, hybrid equal-difference output and equal-ratio output can be realized. For example, in the startup working condition, the equal-ratio pure hydraulic transmission $H_2$ is used for zero-speed startup and then linked to the stages $HM_1$, $HM_2$, $HM_3$, and $HM_4$ in order, thereby realizing forward equal-ratio output; the equal-difference mode is adopted in the reverse gear working condition, that is, the reverse half stage of the pure hydraulic transmission $H_1$ is linked to the hydro-mechanical transmission $HM_f$. Therefore, the speed regulation range of the transmission device is effectively improved, and the transmission can be shifted to the hybrid output stage, that is, the hydro-mechanical transmission $HM_5$ and $HM_6$, according to actual needs during the speed regulation process.

The transmission device of the present disclosure obtains 12 mechanical gears to deal with emergencies when the hydraulic speed regulation system fails, wherein four mechanical gears $M_1$, $M_2$, $M_7$, and $M_8$ are output from the equal-difference end while the other eight mechanical gears $M_3$, $M_4$, $M_5$, $M_6$, $M_9$, $M_{10}$, $M_{11}$, and $M_{12}$ are output from the equal-ratio end, and when the coupling mechanism is engaged, the mechanical gears can be output from the two ends at the same time. The 12 mechanical gears include forward gears and reverse gears to meet the requirement of variable-speed propulsion of common stepped mechanical transmissions. The engagement state of the components and the rotation speed relationships are shown in Table 3:

TABLE 3

Engagement state of mechanical gear components and rotation speed relationships

| No. | Gear | Engagement state | Rotation speed relationship |
| --- | --- | --- | --- |
| 1 | $M_1$ | $C_2$, $C_7$ | $n_0 = -\frac{1}{i_2 i_5} n_e$ |
| 2 | $M_2$ | $C_2$, $C_8$ | $n_0 = \frac{1}{i_2 i_6} n_e$ |
| 3 | $M_3$ | $C_2$, $C_4$, B, $C_9$ | $n_0 = \frac{(1+k_1)}{k_1 i_7 i_2} n_e$ |
| 4 | $M_4$ | $C_2$, $C_4$, B, $C_{10}$ | $n_0 = \frac{(1+k_1)}{k_1 i_8 i_2} n_e$ |
| 5 | $M_5$ | $C_2$, $C_5$, B, $C_9$ | $n_0 = \frac{(1+k_1)k_2}{(1+k_2)i_2 k_1 i_7} n_e$ |
| 6 | $M_6$ | $C_2$, $C_5$, B, $C_{10}$ | $n_0 = \frac{(1+k_1)k_2}{(1+k_2)i_2 k_1 i_8} n_e$ |
| 7 | $M_7$ | $C_3$, B, $C_7$ | $n_0 = -\frac{k_1}{(1+k_1)i_5 i_3} n_e$ |

TABLE 3-continued

Engagement state of mechanical gear components and rotation speed relationships

| No. | Gear | Engagement state | Rotation speed relationship |
|---|---|---|---|
| 8 | $M_8$ | $C_3$, B, $C_8$ | $n_0 = \dfrac{k_1}{(1+k_1)i_6 i_3}$ |
| 9 | $M_9$ | $C_3$, B, $C_5$, $C_9$ | $n_0 = \dfrac{k_2}{(1+k_2)i_7 i_3} n_e$ |
| 10 | $M_{10}$ | $C_3$, B, $C_5$, $C_{10}$ | $n_0 = \dfrac{k_2}{(1+k_2)i_8 i_3} n_e$ |
| 11 | $M_{11}$ | $C_3$, $C_4$, $C_9$ | $n_0 = \dfrac{1}{i_3 i_7} n_e$ |
| 12 | $M_{12}$ | $C_3$, $C_4$, $C_{10}$ | $n_0 = \dfrac{1}{i_3 i_8} n_e$ |

When the first mechanical path input clutch $C_2$ 1-5 and the second variable transmission ratio output clutch $C_7$ 4-5 are engaged, the engine power is input from the input shaft 1-1, then passes through the first mechanical path input gear pair $i_2$ 1-4 and the second variable transmission ratio output gear pair $i_5$ 4-4, and is output from the equal-difference output shaft 4-1, thereby realizing the mechanical gear $M_1$.

When the first mechanical path input clutch $C_2$ 1-5 and the third variable transmission ratio output clutch $C_8$ 4-6 are engaged, the engine power is input from the input shaft 1-1, then passes through the first mechanical path input gear pair $i_2$ 1-4 and the third variable transmission ratio output gear pair $i_6$ 4-7, and is output from the equal-difference output shaft 4-1, thereby realizing the mechanical gear $M_2$.

When the first mechanical path input clutch $C_2$ 1-5, the fixed connection clutch $C_4$ 3-3, the fourth variable transmission ratio output clutch $C_9$ 5-2, and the brake B 2-4 are engaged, the engine power is input from the input shaft 1-1 and is transmitted through the first mechanical path input gear pair $i_2$ 1-4 to the front planetary-gear-set planet carrier 3-4. Since the front planetary-gear-set sun gear 3-7 is held by the brake B 2-4, the power is output from the front planetary-gear-set ring gear 3-1 to the rear planetary-gear-set ring gear 3-2. Since the fixed connection clutch $C_4$ 3-3 is engaged, the rear planetary gear set is fixedly connected as a whole, and the power passes through the fourth variable transmission ratio output gear pair $i_7$ 5-1 and is output from the equal-ratio output shaft 5-6, thereby realizing the mechanical gear $M_3$.

When the first mechanical path input clutch $C_2$ 1-5, the fixed connection clutch $C_4$ 3-3, the fifth variable transmission ratio output clutch $C_{10}$ 5-3, and the brake B 2-4 are engaged, the engine power is input from the input shaft 1-1 and is transmitted through the first mechanical path input gear pair $i_2$ 1-4 to the front planetary-gear-set planet carrier 3-4. Since the front planetary-gear-set sun gear 3-7 is held by the brake B 2-4, the power is output from the front planetary-gear-set ring gear 3-1 to the rear planetary-gear-set ring gear 3-2. Since the fixed connection clutch $C_4$ 3-3 is engaged, the rear planetary gear set is fixedly connected as a whole, and the power passes through the fifth variable transmission ratio output gear pair $i_8$ 5-4 and is output from the equal-ratio output shaft 5-6, thereby realizing the mechanical gear $M_4$.

When the first mechanical path input clutch $C_2$ 1-5, the rear planetary-gear-set hydraulic power input clutch $C_5$ 3-8, the fourth variable transmission ratio output clutch $C_9$ 5-4, and the brake B 2-4 are engaged, the engine power is input from the input shaft 1-1 and is transmitted through the first mechanical path input gear pair $i_2$ 1-4 to the front planetary-gear-set planet carrier 3-4. Since the front planetary-gear-set sun gear 3-7 is held by the brake B 2-4, the power is output from the front planetary-gear-set ring gear 3-1 to the rear planetary-gear-set ring gear 3-2. Since the rear planetary-gear-set hydraulic power input clutch $C_5$ 3-8 is engaged, the rear planetary-gear-set sun gear 3-6 is also held by the brake, and the power passes through the fourth variable transmission ratio output gear pair $i_7$ 5-1 and is output from the equal-ratio output shaft 5-6, thereby realizing the mechanical gear $M_5$.

When the first mechanical path input clutch $C_2$ 1-5, the rear planetary-gear-set hydraulic power input clutch $C_5$ 3-8, the fifth variable transmission ratio output clutch $C_{10}$ 5-3, and the brake B 2-4 are engaged, the engine power is input from the input shaft 1-1 and is transmitted through the first mechanical path input gear pair $i_2$ 1-4 to the front planetary-gear-set planet carrier 3-4. Since the front planetary-gear-set sun gear 3-7 is held by the brake B 2-4, the power is output from the front planetary-gear-set ring gear 3-1 to the rear planetary-gear-set ring gear 3-2. Since the rear planetary-gear-set hydraulic power input clutch $C_5$ 3-8 is engaged, the rear planetary-gear-set sun gear 3-6 is also held by the brake, and the power passes through the fifth variable transmission ratio output gear pair $i_8$ 5-4 and is output from the equal-ratio output shaft 5-6, thereby realizing the mechanical gear MU.

When the second mechanical path input clutch $C_3$ 1-7, the second variable transmission ratio output clutch $C_7$ 4-5, and the brake B 2-4 are engaged, the engine power is input from the input shaft 1-1, then passes through the second mechanical path input gear pair $i_3$ 1-6, and is input to the front planetary-gear-set ring gear 3-1. Since the front planetary-gear-set sun gear 3-7 is held by the brake, the power passes through the front planetary-gear-set planet carrier 3-4 and the second variable transmission ratio output gear pair $i_8$ 4-4 and is output from the equal-difference output shaft 4-1, thereby realizing the mechanical gear $M_7$.

When the second mechanical path input clutch $C_3$ 1-7, the third variable transmission ratio output clutch $C_8$ 4-6, and the brake B 2-4 are engaged, the engine power is input from the input shaft 1-1, then passes through the second mechanical path input gear pair $i_3$ 1-6, and is input to the front planetary-gear-set ring gear 3-1. Since the front planetary-gear-set sun gear 3-7 is held by the brake, the power passes through the front planetary-gear-set planet carrier 3-4 and the third variable transmission ratio output gear pair $i_6$ 4-7 and is output from the equal-difference output shaft 4-1, thereby realizing the mechanical gear $M_5$.

When the second mechanical path input clutch $C_3$ 1-7, the rear planetary-gear-set hydraulic power input clutch $C_5$ 3-8, the fourth variable transmission ratio output clutch $C_9$ 5-2, and the brake B 2-4 are engaged, the engine power is input from the input shaft 1-1, then passes through the second mechanical path input gear pair $i_3$ 1-6, and is input to the rear planetary-gear-set ring gear 3-2. Since the rear planetary-gear-set sun gear 3-6 is held by the brake B 2-4, the power passes through the rear planetary-gear-set planet carrier 3-5 and the fourth variable transmission ratio output gear pair $i_7$ 5-1 and is output from the equal-ratio output shaft 5-6, thereby realizing the mechanical gear $M_9$.

When the second mechanical path input clutch $C_3$ 1-7, the rear planetary-gear-set hydraulic power input clutch $C_5$ 3-8, the fifth variable transmission ratio output clutch $C_{10}$ 5-3, and the brake B 2-4 are engaged, the engine power is input from the input shaft 1-1, then passes through the second mechanical path input gear pair $i_3$ 1-6, and is input to the rear planetary-gear-set ring gear 3-2. Since the rear planetary-gear-set sun gear 3-6 is held by the brake B 2-4, the power passes through the rear planetary-gear-set planet carrier 3-5 and the fifth variable transmission ratio output gear pair $i_8$ 5-4 and is output from the equal-ratio output shaft 5-6, thereby realizing the mechanical gear $M_{10}$.

When the second mechanical path input clutch $C_3$ 1-7, the fixed connection clutch $C_4$ 3-3, and the fourth variable transmission ratio output clutch $C_9$ 5-2 are engaged, the engine power is input from the input shaft 1-1, then passes through the second mechanical path input gear pair $i_3$ 1-6, and is input to the rear planetary-gear-set ring gear 3-2. Since the fixed connection clutch $C_4$ 3-3 is engaged, the rear planetary gear set is fixedly connected as a whole, and the power passes through the fourth variable transmission ratio output gear pair $i_7$ 5-1 and is output from the equal-ratio output shaft 5-6, thereby realizing the mechanical gear $M_{11}$.

When the second mechanical path input clutch $C_3$ 1-7, the fixed connection clutch $C_4$ 3-3, and the fifth variable transmission ratio output clutch $C_{10}$ 5-3 are engaged, the engine power is input from the input shaft 1-1, then passes through the second mechanical path input gear pair $i_3$ 1-6, and is input to the rear planetary-gear-set ring gear 3-2. Since the fixed connection clutch $C_4$ 3-3 is engaged, the rear planetary gear set is fixedly connected as a whole, and the power passes through the fifth variable transmission ratio output gear pair $i_8$ 5-4 and is output from the equal-ratio output shaft 5-6, thereby realizing the mechanical gear $M_{12}$.

EMBODIMENT $$i_1=i_2=i_3=1, i_4=i_9=4, i_5=i_6=4/3, i_7=2, i_8=0.5,$$

$$\Delta n=0.5, q=2, k_1=2, k_2=3$$

wherein $\Delta n$ is a difference between rotation speeds in the hydraulic transmission $H_1$ and the hydro-mechanical stage $HM_f$ or a difference between rotation speeds in the hydraulic transmission $H_3$ and the hydro-mechanical stage $HM_z$.

$$n_{H_{1max}} - n_{H_{1min}} = n_{HM_{fmax}} - n_{HM_{fmin}} = \Delta n, \text{ and}$$
$$n_{HM_{fmax}} = n_{H_{1min}}$$

or $n_{H_{3max}} - n_{H_{3min}} = n_{HM_{zmax}} - n_{HM_{zmin}} = \Delta n$, and
$$n_{H_{3max}} = n_{HM_{zmin}};$$

$$\frac{HM_{1max}}{HM_{1min}} = \frac{HM_{2max}}{HM_{2min}} = \frac{HM_{3max}}{HM_{3min}} = \frac{HM_{4max}}{HM_{4min}} = q,$$

and $HM_{1max} = HM_{2min}$, $HM_{2max} = HM_{3min}$, $HM_{3max} = HM_{min}$.

Figure 13:
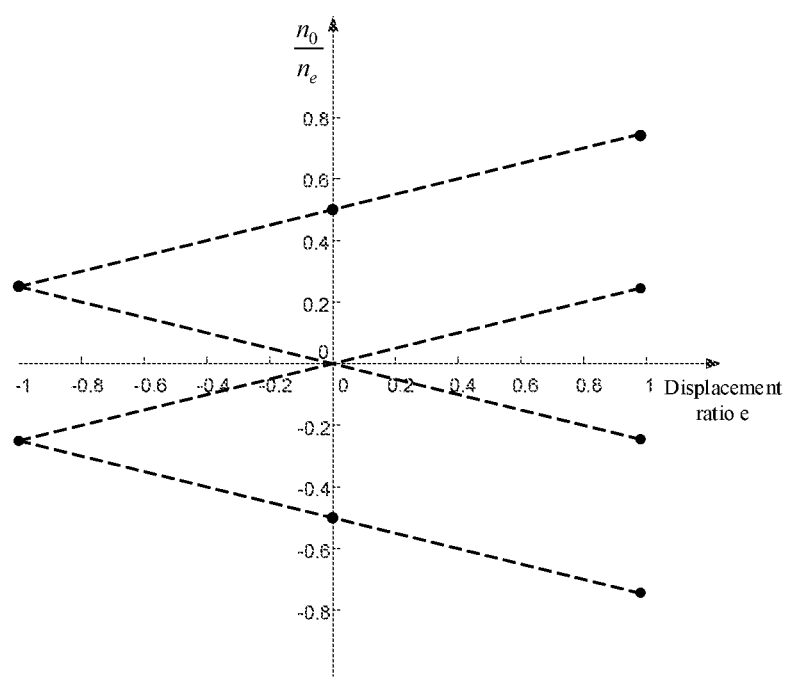
FIG. 13 shows characteristic curves of equal-difference speed regulation.

FIG. 13 shows characteristic curves of equal-difference two-stage speed regulation, wherein the hydraulic transmission $H_1$ and the reverse hydro-mechanical stage $HM_f$ form output in the equal-difference two-stage mode I, while the hydraulic transmission $H_3$ and the forward hydro-mechanical stage $HM_z$ form output in the equal-difference two-stage mode II, and the tolerance $\Delta n$ of each mode is 0.5.

When output in the equal-difference two-stage mode I is adopted, zero-speed startup is carried out at the pure hydraulic transmission stage $H_1$ and the output speed increases linearly with the increase of the displacement ratio e of the variable displacement pump. When e=1, the hydraulic transmission $H_1$ reaches the positive maximum value $0.25n_e$. In the reverse gear working condition, that is, when the displacement ratio changes from 0 to −1, the hydraulic transmission $H_1$ reaches the negative maximum value $-0.25n_e$ and can be synchronously shifted to the hydro-mechanical transmission $HM_f$. As the displacement ratio e of the variable displacement pump changes within the range of [−1,1], the output speed changes from $-0.25n_e$ to $-0.75n_e$, wherein $M_7(0, -0.5n_e)$ is a mechanical point at the hydro-mechanical stage $HM_f$.

When output in the equal-difference two-stage mode II is adopted, zero-speed startup is carried out at the pure hydraulic transmission $H_3$ and the output speed increases linearly with the decrease of the displacement ratio e of the variable displacement pump. When e=−1, the hydraulic transmission $H_3$ reaches the positive maximum value $0.25n_e$ and can be synchronously shifted to the hydro-mechanical transmission $HM_z$. As the displacement ratio e of the variable displacement pump changes within the range of [−1,1], the output speed changes from $0.25n_e$ to $0.75n_e$, wherein $M_B(0, 0.5n_e)$ is a mechanical point at the hydro-mechanical stage $HM_z$. In the reverse gear working condition, that is, when the displacement ratio changes from 0 to 1, the hydraulic transmission $H_3$ reaches the negative maximum value $-0.25n_e$.

Figure 14:
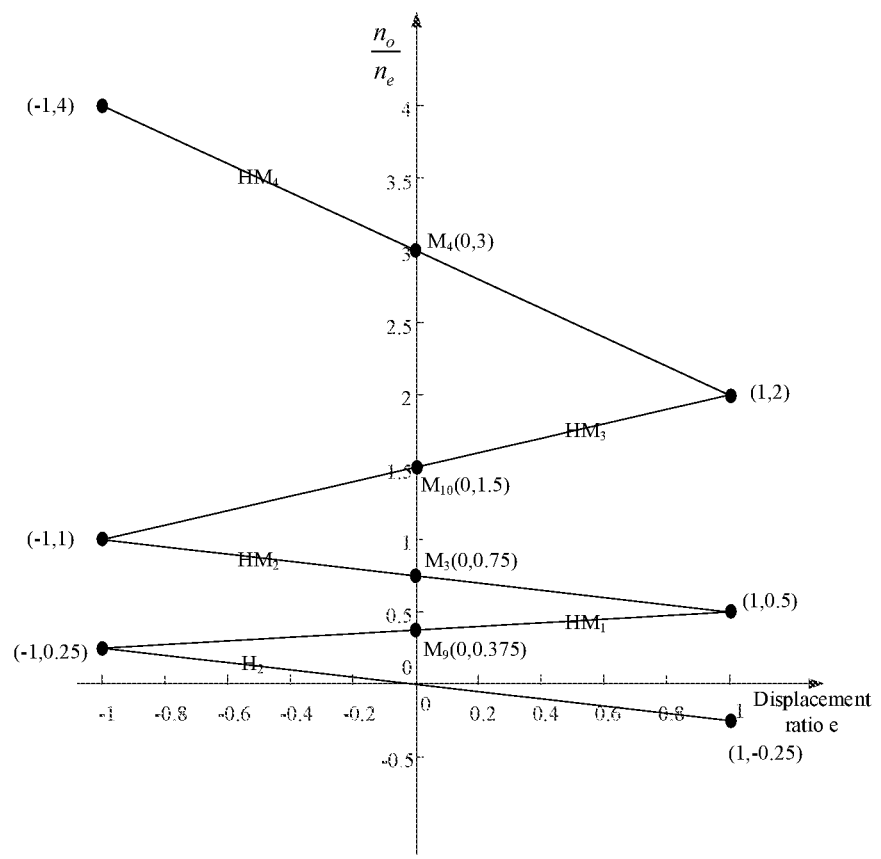
FIG. 14 shows characteristic curves of equal-ratio speed regulation.

FIG. 14 shows characteristic curves of equal-ratio speed regulation. Zero-speed startup is carried out at the pure hydraulic transmission $H_2$. As the displacement ratio e of the variable displacement pump changes from 0 to −1, the output speed changes from 0 to $0.25n_e$, and the transmission can be synchronously shifted to the hydro-mechanical transmission $HM_1$. As the displacement ratio e of the variable displacement pump changes from −1 to 1, the output speed changes from $0.25n_e$ to $0.5n_e$, and the transmission can be synchronously shifted to the hydro-mechanical transmission $HM_2$. As the displacement ratio e of the variable displacement pump changes from 1 to −1, the output speed changes from $0.5n_e$ to $1n_e$, and the transmission can be synchronously shifted to the hydro-mechanical transmission $HM_3$. As the displacement ratio e of the variable displacement pump changes from −1 to 1, the output speed changes from $n_e$ to $2n_e$, and the transmission can be synchronously shifted to the hydro-mechanical transmission $HM_4$. As the displacement ratio e of the variable displacement pump changes from 1 to −1, the output speed changes from $2n_e$ to $4n_e$. The reverse gear working condition is also realized by the pure hydraulic transmission stage $H_2$. As the displacement ratio e of the variable displacement pump changes from 0 to 1, the output speed changes from 0 to $0.25n_e$. Therefore, the speed regulation range $[-0.25, 4]n_e$ of the output speed is realized, wherein $$M_9\left(0, \frac{3}{8}n_e\right), M_3\left(0, \frac{3}{4}n_e\right), M_{10}\left(0, \frac{3}{2}n_e\right),$$

and $M_4(0, 3)$ are mechanical points.

Figure 15:
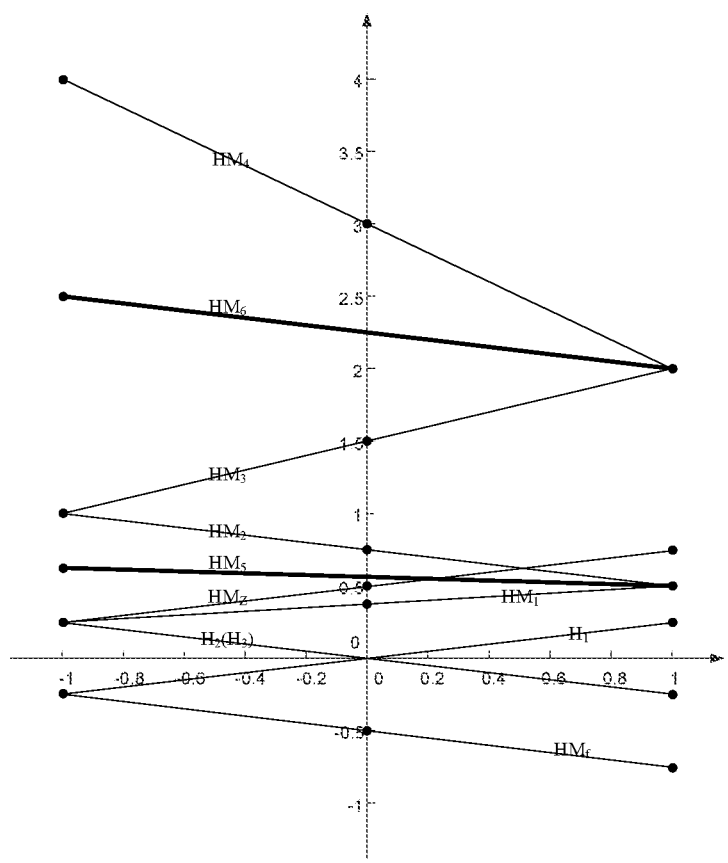
FIG. 15 shows characteristic curves of speed regulation in hybrid equal-difference output and equal-ratio output.

FIG. 15 shows characteristic curves of speed regulation in hybrid equal-difference output and equal-ratio output. When the coupling mechanism L 6 is engaged, hybrid equal-difference output and equal-ratio output can be realized. For example, in the startup working condition, the equal-ratio pure hydraulic transmission $H_2$ is used for zero-speed startup and then linked to the stages $HM_1$, $HM_2$, $HM_3$, and $HM_4$ in order, thereby realizing forward equal-ratio output; the equal-difference mode is adopted in the reverse gear working condition, that is, the reverse half stage of the pure hydraulic transmission $H_1$ is linked to $HM_f$ and the transmission device can realize the speed regulation range of $[-0.75,4]n_e$. Therefore, the speed regulation range is extended, and the transmission can be shifted to the hybrid output stage, that is, the hydro-mechanical transmission $HM_5$ and $HM_6$, according to actual needs during the speed regulation process.

Figure 16:
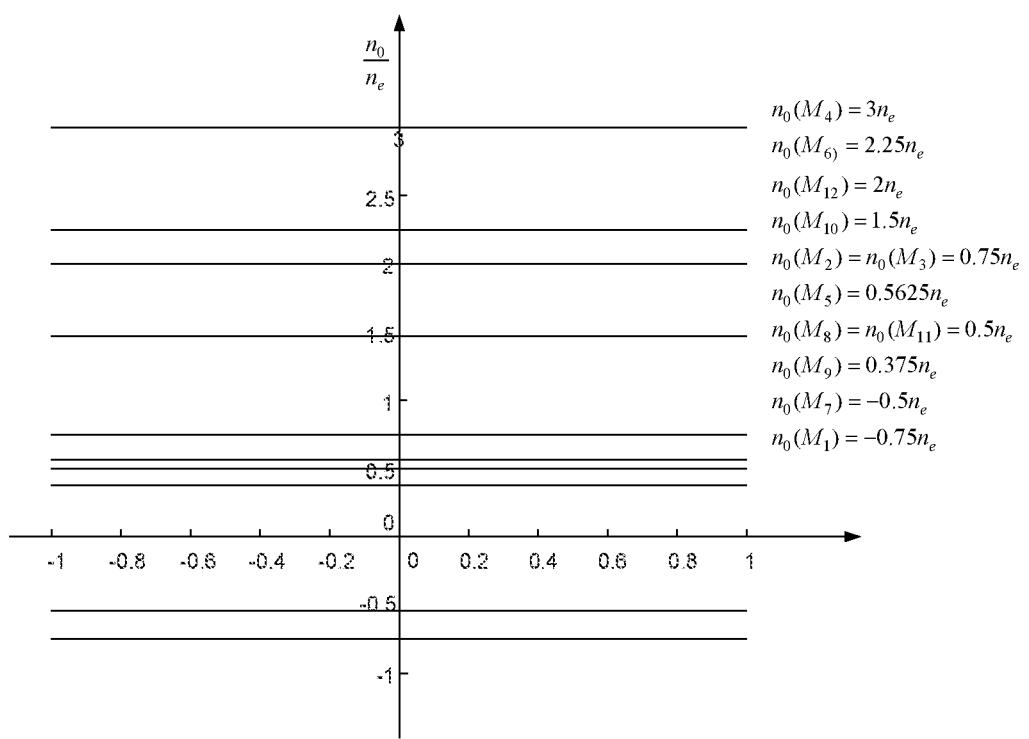
FIG. 16 shows mechanical gear speeds.

FIG. 16 shows mechanical gear speeds. When the hydraulic path fails, outputs of the 12 fixed mechanical gears can be realized by pure mechanical transmission, wherein the four mechanical gears $M_1$, $M_2$, $M_7$, and $M_8$ are output from the equal-difference output shaft 4-1 while the other eight mechanical gears $M_3$, $M_4$, $M_5$, $M_8$, $M_9$, $M_{10}$, $M_{11}$, and $M_{12}$ are output from the equal-ratio output shaft 5-6, and when the coupling mechanism L 6 is engaged, the mechanical gears can be output from the two ends at the same time. The 12 fixed gears include 10 forward gears and 2 reverse gears to meet the requirement of variable-speed propulsion of common stepped mechanical transmission mechanisms.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present disclosure, and are not intended to limit the protection scope of the present disclosure. Any equivalent embodiments or modifications made without departing from the spirit of the present disclosure shall fall within the protection scope of the present disclosure.

What is claimed is:

1. A continuously variable transmission with both equal-difference output and equal-ratio output, comprising an input mechanism, a hydraulic transmission mechanism, a planetary-gear-set convergence mechanism, an equal-difference output mechanism, an equal-ratio output mechanism, a clutch assembly, and a brake B, wherein the clutch assembly connects an output end of the input mechanism to an input end of the hydraulic transmission mechanism and the planetary-gear-set convergence mechanism and connects an output end of the hydraulic transmission mechanism to the planetary-gear-set convergence mechanism, the clutch assembly connects the planetary-gear-set convergence mechanism to the equal-difference output mechanism and the equal-ratio output mechanism, and the clutch assembly connects the equal-ratio output mechanism to the equal-difference output mechanism;

a continuously changing transmission ratio between the input mechanism and the equal-difference output mechanism and/or between the input mechanism and the equal-ratio output mechanism is provided by adjusting a displacement ratio of the hydraulic transmission mechanism and selectively controlling an engagement of the clutch assembly and the brake.

2. The continuously variable transmission with both equal-difference output and equal-ratio output according to claim 1, wherein the planetary-gear-set convergence mechanism comprises a front planetary gear mechanism and a rear planetary gear mechanism, wherein a ring gear of the front planetary gear mechanism is connected to a ring gear of the rear planetary gear mechanism, and the input end of the hydraulic transmission mechanism is connected to a sun gear of the front planetary gear mechanism;

the clutch assembly comprises a hydraulic path input clutch $C_1$, a first variable transmission ratio output clutch $C_6$, a sixth variable transmission ratio output clutch $C_{11}$ and a coupling mechanism L, wherein the hydraulic path input clutch $C_1$ is used for selectively connecting the output end of the input mechanism to the input end of the hydraulic transmission mechanism via a hydraulic path input gear pair $i_1$; the first variable transmission ratio output clutch $C_6$ is used for selectively connecting the output end of the hydraulic transmission mechanism to the equal-difference output mechanism via a first variable transmission ratio output gear pair $i_4$; the sixth variable transmission ratio output clutch $C_{11}$ is used for selectively connecting the output end of the hydraulic transmission mechanism to the equal-ratio output mechanism via a sixth variable transmission ratio output gear pair $i_9$; the coupling mechanism L is used for selectively connecting the equal-difference output mechanism to the equal-ratio output mechanism;

the hydraulic path input clutch $C_1$ and the first variable transmission ratio output clutch $C_6$ are engaged to provide continuous hydraulic transmission $H_1$ between the input mechanism and the equal-difference output mechanism; the hydraulic path input clutch $C_1$ and the sixth variable transmission ratio output clutch $C_{11}$ are engaged to provide continuous hydraulic transmission $H_2$ between the input mechanism and the equal-ratio output mechanism; the hydraulic path input clutch $C_1$, the sixth variable transmission ratio output clutch $C_{11}$, and the coupling mechanism L are engaged to provide continuous hydraulic transmission $H_3$ between the input mechanism and the equal-difference output mechanism and between the input mechanism and the equal-ratio output mechanism.

3. The continuously variable transmission with both equal-difference output and equal-ratio output according to claim 2, wherein the clutch assembly further comprises a first mechanical path input clutch $C_2$, a second mechanical path input clutch $C_3$, a fixed connection clutch $C_4$, a rear planetary-gear-set hydraulic power input clutch $C_5$, a second variable transmission ratio output clutch $C_7$, a third variable transmission ratio output clutch $C_8$, a fourth variable transmission ratio output clutch $C_9$, and a fifth variable transmission ratio output clutch $C_{10}$;

the first mechanical path input clutch $C_2$ is used for selectively connecting the output end of the input mechanism to a planet carrier of the front planetary gear mechanism via a first mechanical path input gear pair $i_2$; the second mechanical path input clutch $C_3$ is used for selectively connecting the output end of the input mechanism to the ring gear of the rear planetary gear mechanism via a second mechanical path input gear pair $i_3$; the fixed connection clutch $C_4$ is used for selectively connecting the ring gear of the rear planetary gear mechanism to a planet carrier of the rear planetary gear mechanism; the rear planetary-gear-set hydraulic power input clutch $C_5$ is used for selectively connecting the output end of the hydraulic transmission mechanism to a sun gear of the rear planetary gear mechanism; the second variable transmission ratio output clutch $C_7$ is used for selectively connecting the planet carrier of the front planetary gear mechanism to the equal-difference output mechanism via a second variable transmission ratio output gear pair $i_5$; the third variable transmission ratio output clutch $C_8$ is used for selectively connecting the planet carrier of the front planetary gear mechanism to the equal-difference output mechanism via a third variable transmission ratio output gear pair $i_6$; the fourth variable transmission ratio output clutch $C_9$ is used for selectively connecting the planet carrier of the rear planetary gear mechanism to the equal-ratio output mechanism via a fourth variable transmission ratio output gear pair $i_7$; the fifth variable transmission ratio output clutch $C_{10}$ is used for selectively connecting the planet carrier of the rear planetary gear mechanism to the equal-ratio output mechanism via a fifth variable transmission ratio output gear pair $i_8$;

the hydraulic path input clutch $C_1$, the second mechanical path input clutch $C_3$, and the second variable transmission ratio output clutch $C_7$ are engaged to provide continuous hydro-mechanical transmission $HM_f$ between the input mechanism and the equal-difference output mechanism;

the hydraulic path input clutch $C_1$, the second mechanical path input clutch $C_3$, and the third variable transmission ratio output clutch $C_8$ are engaged to provide continuous hydro-mechanical transmission $HM_z$ between the input mechanism and the equal-difference output mechanism;

the hydraulic path input clutch $C_1$, the second mechanical path input clutch $C_3$, the rear planetary-gear-set hydraulic power input clutch $C_5$, and the fourth variable transmission ratio output clutch $C_9$ are engaged to provide continuous hydro-mechanical transmission $HM_1$ between the input mechanism and the equal-difference output mechanism;

the hydraulic path input clutch $C_1$, the first mechanical path input clutch $C_2$, the fixed connection clutch $C_4$, and the fourth variable transmission ratio output clutch $C_9$ are engaged to provide continuous hydro-mechanical transmission $HM_2$ between the input mechanism and the equal-difference output mechanism;

the hydraulic path input clutch $C_1$, the second mechanical path input clutch $C_3$, the rear planetary-gear-set hydraulic power input clutch $C_5$, and the fifth variable transmission ratio output clutch $C_{10}$ are engaged to provide continuous hydro-mechanical transmission $HM_3$ between the input mechanism and the equal-difference output mechanism;

the hydraulic path input clutch $C_1$, the first mechanical path input clutch $C_2$, the fixed connection clutch $C_4$, and the fifth variable transmission ratio output clutch $C_{10}$ are engaged to provide continuous hydro-mechanical transmission $HM_4$ between the input mechanism and the equal-difference output mechanism;

the hydraulic path input clutch $C_1$, the first mechanical path input clutch $C_2$, the rear planetary-gear-set hydraulic power input clutch $C_5$, the fourth variable transmission ratio output clutch $C_9$, and the coupling mechanism L are engaged to provide continuous hydro-mechanical transmission $HM_5$ between the input mechanism and the equal-difference output mechanism and between the input mechanism and the equal-ratio output mechanism; and the hydraulic path input clutch $C_1$, the first mechanical path input clutch $C_2$, the rear planetary-gear-set hydraulic power input clutch $C_5$, the fifth variable transmission ratio output clutch $C_{10}$, and the coupling mechanism L are engaged to provide continuous hydro-mechanical transmission $HM_6$ between the input mechanism and the equal-difference output mechanism and between the input mechanism and the equal-ratio output mechanism.

4. The continuously variable transmission with both equal-difference output and equal-ratio output according to claim 3, wherein when $$\frac{i_4}{i_5} = 1 + k_1 \text{ and } \frac{i_3}{i_1} = \frac{k_1}{2},$$

equal-difference two-stage stepless shift is formed between the hydraulic transmission $H_1$ and the hydro-mechanical transmission $HM_f$ by adjusting the displacement ratio of the hydraulic transmission mechanism and selectively controlling the clutch assembly, wherein $k_1$ is a planetary gear characteristic parameter of the front planetary gear mechanism.

5. The continuously variable transmission with both equal-difference output and equal-ratio output according to claim 3, wherein when $$\frac{i_9}{i_6} = 1 + k_1 \text{ and } \frac{i_3}{i_1} = \frac{k_1}{2},$$

equal-difference two-stage stepless shift is formed between the hydraulic transmission $H_3$ and the hydro-mechanical transmission HM by adjusting the displacement ratio of the hydraulic transmission mechanism and selectively controlling the clutch assembly, wherein $k_1$ is the planetary gear characteristic parameter of the front planetary gear mechanism.

6. The continuously variable transmission with both equal-difference output and equal-ratio output according to claim 3, wherein when $$\frac{\frac{k_2}{i_3}+\frac{1}{i_1}}{\frac{k_2}{i_3}-\frac{1}{i_1}} = \frac{\frac{1+k_1}{i_2}+\frac{1}{i_1}}{\frac{1+k_1}{i_2}-\frac{1}{i_1}}, \frac{\frac{k_2}{i_3}+\frac{1}{i_1}}{(1+k_2)} = \frac{\frac{1+k_1}{i_2}-\frac{1}{i_1}}{k_1},$$

$$\text{and } \frac{\frac{1+k_1}{i_2}+\frac{1}{i_1}}{k_1 i_7} = \frac{\frac{k_2}{i_3}-\frac{1}{i_1}}{(1+k_2)i_8},$$

equal-ratio four-stage stepless shift is formed between the hydraulic transmission $H_2$, the hydro-mechanical transmission $HM_1$, the hydro-mechanical transmission $HM_2$, the hydro-mechanical transmission $HM_3$, and the hydro-mechanical transmission $HM_4$ by adjusting the displacement ratio of the hydraulic transmission mechanism and selectively controlling the clutch assembly, wherein $k_1$ is the planetary gear characteristic parameter of the front planetary gear mechanism and $k_2$ is a planetary gear characteristic parameter of the rear planetary gear mechanism.

7. The continuously variable transmission with both equal-difference output and equal-ratio output according to claim 3, wherein the brake B is used for selectively connecting the sun gear of the front planetary gear mechanism to a fixed member; and mechanical transmission of multiple transmission ratios is provided between the input mechanism and the equal-difference output mechanism or between the input mechanism and the equal-ratio output mechanism by selectively controlling the engagement of the clutch assembly and the brake B.

\* \* \* \* \*